US008104742B2

(12) United States Patent
Ishihara et al.

(10) Patent No.: US 8,104,742 B2
(45) Date of Patent: Jan. 31, 2012

(54) FLOW CONTROL VALVE

(75) Inventors: Tetsuya Ishihara, Nagoya (JP); Shigeru Osugi, Kasugai (JP); Yukie Nakamura, Kasugai (JP); Hiroto Yasue, Gifu (JP)

(73) Assignee: CKD Corporation, Komaki-shi (JP)

( * ) Notice: Subject to any disclaimer, the term of this patent is extended or adjusted under 35 U.S.C. 154(b) by 925 days.

(21) Appl. No.: 12/085,179

(22) PCT Filed: Sep. 21, 2006

(86) PCT No.: PCT/JP2006/318763
§ 371 (c)(1),
(2), (4) Date: May 19, 2008

(87) PCT Pub. No.: WO2007/063635
PCT Pub. Date: Jun. 7, 2007

(65) Prior Publication Data
US 2009/0039304 A1 Feb. 12, 2009

(30) Foreign Application Priority Data
Dec. 2, 2005 (JP) ................................. 2005-348742

(51) Int. Cl.
*F16K 31/50* (2006.01)
(52) U.S. Cl. .................... 251/265; 251/296; 251/297
(58) Field of Classification Search .................. 251/265, 251/264, 291, 296, 297
See application file for complete search history.

(56) References Cited

U.S. PATENT DOCUMENTS

| | | | |
|---|---|---|---|
| 2,388,989 A | 11/1945 | Mueser | |
| 3,001,551 A * | 9/1961 | Wyser | 251/96 |
| 3,409,271 A | 11/1968 | Kallenbach | |
| 3,428,291 A * | 2/1969 | Callahan, Jr. et al. | 251/284 |
| 4,917,357 A * | 4/1990 | Danko | 251/214 |
| 5,188,338 A | 2/1993 | Itoi | |
| 5,419,530 A * | 5/1995 | Kumar | 251/285 |
| 5,439,197 A | 8/1995 | Itoi et al. | |
| 5,842,679 A * | 12/1998 | Kolchinsky | 251/42 |
| 6,942,195 B2 * | 9/2005 | Kao | 251/319 |
| 6,994,312 B2 * | 2/2006 | Pauer et al. | 251/285 |

FOREIGN PATENT DOCUMENTS

FR 2 593 260 7/1987
(Continued)

OTHER PUBLICATIONS

Foreign Office Action drafted May 6, 2011, dispatched May 17, 2011 in Japanese Application No. 2007-515725 (with translation).
Office Action dated Aug. 9, 2011 issued in Japanese Patent Application No. 2007-515725 (with translation).

*Primary Examiner* — John Bastianelli
(74) *Attorney, Agent, or Firm* — Oliff & Berridge, PLC

(57) ABSTRACT

A flow control valve is provided in a manner to be capable of locking a position of a differential screw easily without displacing a position adjusted valve element body. The valve element body is brought into or out of contact with a valve seat provided between a first port and a second port, and is connected to an operation member. The operation member is movably inserted into a cover and urged to a direction toward the valve seat by an urging member. A position of the operation member is adjusted by a differential screw, and accordingly a position of the valve seat is adjusted. A rotation member for exerting a rotation force on the differential screw is slidably mounted in the cover along a moving direction of the operation member without rotating. A locking portion is provided in the rotation member to engage with the cover without rotating when the operation member is slid along its moving direction.

8 Claims, 17 Drawing Sheets

FOREIGN PATENT DOCUMENTS

| | | |
|---|---|---|
| JP | U 52-166123 | 12/1977 |
| JP | U 58-119679 | 8/1983 |
| JP | Y2 61-20386 | 6/1986 |
| JP | U-3-115279 | 11/1991 |
| JP | A 05-079570 | 3/1993 |
| JP | A 07-083338 | 3/1995 |
| JP | U-07-025382 | 5/1995 |
| JP | Y2 2541613 | 7/1997 |
| JP | A 11-051217 | 2/1999 |
| JP | A 2001-263507 | 9/2001 |

* cited by examiner

RELATED ART

RELATED ART

FLOW CONTROL VALVE

BACKGROUND

The present invention relates to a flow control valve used for discharging and controlling fluids such as high corrosive chemical liquid or ultra pure water in a semiconductor manufacturing device or the like.

As a flow control valve used for discharging and controlling fluids such as high corrosive chemical liquid or ultra pure water in a semiconductor manufacturing device or the like, there has been known those disclosed for example in Patent Document 1 and Patent Document 2. FIG. 16 is a sectional view of a valve unit 100 of Patent Document 1. FIG. 25 is a sectional view of a flow regulating mechanism 300 of Patent Document 2.

In the valve unit 100 of Patent Document 1 shown in FIG. 16, a flow control valve 110 and an opening/closing valve 101 are mounted in a unit block 102. The flow control valve 110 is a diaphragm valve provided with a differential screw.

The flow control valve 110 is provided with a spindle 112 inserted in a base pipe 111 fixed to the unit block 102. The spindle 112 is movable upward and downward but not rotatable. A diaphragm 113 is fixed at a lower end of the spindle 112, and a spring 115 is mounted in a contracted state between the base pipe 111 and the spindle 112. This spring 115 constantly exerts a force to press the diaphragm 113 down toward a valve seat 114 which is mounted on the unit block 102. The base pipe 111 is exteriorly covered with an outer sleeve 116, and an outer thread portion 117 is provided between the base pipe 111 and the outer sleeve 116 to engage them. In the outer sleeve 116, an inner sleeve 119 inserted between the base pipe 111 and the spindle 112 is fastened with a fixing screw 118. Between the inner sleeve 119 and the spindle 112, an inner thread portion 120 is provided between the inner sleeve 119 and the spindle 112 to engage them. The flow control valve 110 includes a differential screw provided by the outer sleeve 116 and the inner sleeve 119.

In this flow control valve 110, when the outer sleeve 116 and the inner sleeve 119 are rotated integrally, the spindle 112 inside the base pipe 111 is moved axially upward or downward in the figure by a pitch difference between the outer thread portion 117 and the inner thread portion 120, so that a position of the diaphragm 113 is adjusted. The flow control valve 110 includes a cover 121 covering over the outer sleeve 16 so as not to be touched by an operator and the like in order to maintain a position of the differential screw after the adjustment.

The flow regulating mechanism 300 of Patent Document 2 shown in FIG. 25 comprises a valve main body 301 and a direct acting member 302. The direct acting member 302 is movable forward and backward (upward and downward in the figure) in the valve main body 301 by a screw motion of an adjustment screw 303 to adjust a position of a needle member 304 which is mounted at a lower end of the direct acting member 302. The needle member 304 is inserted in an orifice 305 of the valve main body 301 to be movable forward and backward to regulate an opening degree of the orifice 305 to regulate a flow rate of fluid flowing from a fluid inlet port 306 to a fluid outlet port 307. The adjustment screw 303 is formed with a first screw portion 309 threadedly engaging with a groove 308 of the valve main body 301 and a second screw portion 311 threadedly engaging with an inner screw portion 310 of the direct acting member 302. When the first screw portion 309 is rotated, its rotation force is transmitted to the direct acting member 302 through the second screw portion 311. The direct acting member 302 is locked by a pin 313 which is firmly attached to the valve main body 301 and received in a groove 312 of the direct acting member 302 to prevent rotation of the direct acting member 302. The rotation force transmitted from the second screw portion 311 is converted into a driving force to linearly axially move the direct acting member 302, thereby moving the needle member 304 forward and backward in accordance with a pitch of the second screw portion 311. In the flow regulating mechanism 300, minute control can be achieved accurately by a difference between a pitch P1 of the first screw portion 309 and a pitch P2 of the second screw portion 311.

Patent Document 1: Japanese Unexamined Patent Application No. 2001-263507A (Paragraphs [0014] to [0019], and FIG. 2)

Patent Document 2: Japanese Unexamined Patent Application No. 11 (1999)-051217A

SUMMARY

However, the flow control valve 110 and the flow regulating mechanism 300 in the prior arts have following problems.

(1) The flow control valve 110 in FIG. 16 is provided with the cover 121 covering over the outer sleeve 116 to retain a position of the differential screw. Therefore, at a time of flow controlling, the cover 121 has to be detached to rotate the outer sleeve 116 for the flow controlling, and then the cover 121 is attached in the flow control valve 110 again. Thus, laborious handling and detachment of the cover 121 is required during an operation.

On the other hand, a flow control valve 210 as shown in FIG. 17, for example, is provided with a locknut 221 to fix a position of a screw portion, so that a position of a diaphragm valve element 214 can be easily adjusted by hand without detaching a cover 212. However, the flow control valve 210 in FIG. 17 has a possibility that the position of the diaphragm valve element 214 could be changed when the locknut 221 is fastened.

The flow control valve 210 shown in FIG. 17 is provided with a movable member 213 to be movable inside the cover 212 mounted on a passage block 211. The diaphragm valve element 214 is coupled to a lower end of the movable member 213 to come into or out of contact with a valve seat 215. A spring 216 is mounted in between the movable member 213 and the cover 212 in a contracted state to constantly urge the diaphragm valve element 214 toward the valve seat. A stroke adjustment rod 217 is inserted in the cover 212 from above and connected to the movable member 213. In the flow control valve 210, a differential screw is constituted of a first thread portion 218 formed between the cover 212 and the rod 217 and a second thread portion 219 formed between the movable member 213 and the rod 217. The flow control valve 210 is provided with the locknut 221 to fix the adjusted position of the thread portions. The locknut 221 is threadedly engaged with the rod 217.

In the flow control valve 210, during flow controlling, a lock thread portion 222 between the locknut 221 and the stroke adjustment rod 217 does not exert a force to any one of upward or downward directions as shown in FIG. 18. Therefore, the rod 217 is pressed down toward the valve seat 215 by means of elastic force of the spring 216. Then, at the first thread portion 218 of the flow control valve 210, threads of the rod 217 are brought into contact with downward slopes in the figure as shown in FIG. 19. Similarly, at the second thread portion 219, the threads of the rod 217 are brought into contact with upward slopes in the figure as shown in FIG. 20.

As a result, a stroke is adjusted in accordance with a pitch difference between the first thread portion 218 and the second thread portion 219.

Subsequently, in the flow control valve 210, the locknut 221 is screwed to the stroke adjustment rod 217 to fix the rod 217 to the cover 212, so that the position of the differential screw is locked. In this case, as shown in FIG. 21, at the lock thread portion 222, the threads of the rod 217 are brought into contact with downward slopes in the figure to resist the elastic force of the spring 216, pulling up the rod 217. As shown in FIG. 19, since the first thread portion 218 of the flow control valve 210 has backlash during the flow controlling, when the rod 217 is pulled up by fastening the locknut 221, the rod 217 is moved up by the backlash S of the first thread portion 218 as shown in FIG. 22. Accordingly, contact surfaces of the threads of the rod 217 come into contact with upward slopes in the figure instead of downward slopes thereof. Further, since the movable member 213 is urged down toward the valve seat 215 by the spring 216, as shown in FIG. 23, the second thread portion 219 remains in contact with the upward slopes of the threads of the movable member 213 as same as during the flow controlling shown in FIG. 20. Consequently, when the locknut 221 is fastened, the rod 217 is lifted up by the backlash S of the first thread portion 218, and accordingly the movable member 213 is also lifted up integrally, thereby changing the position of the diaphragm valve element 214.

Specifically, it is for example assumed that, when the stroke adjustment rod 217 in the flow control valve 210 is rotated one turn (360 degrees), the diaphragm valve element 214 is moved by 0.05 mm. The rotation of the rod 217 will provide flow rate characteristics as shown in FIG. 24. In the flow control valve 210, the rod 217 is rotated 5 turns from a valve closing position to adjust a flow rate to 200 mL/min as indicated at a point E1 in FIG. 24, and then the locknut 221 is fastened to keep the flow rate. In this case, for example, when the backlash S of the first thread portion 218 is 0.1 mm to 0.2 mm, the rod 217 may be moved by the backlash S of 0.1 mm to 0.2 mm to lift up the diaphragm valve element 214. In this case, the diaphragm valve element 214 is displaced by the same degree as in the case where the rod 217 is additionally rotated 2 to 4 turns. Consequently, even if the flow rate is adjusted to 200 mL in the flow control valve 210 during the flow controlling, the flow rate could be increased to 280 to 360 mL/min as indicated at points E2 and E3 in FIG. 24 after the rod 217 is locked. Therefore, in the flow control valve 210, such displacement of the diaphragm valve element 214 caused by fastening the locknut 221 has to be taken into consideration for the stroke adjustment. In other words, the stroke could be extremely hard to adjust.

As mentioned above, when a flow control valve comprising a differential screw is provided with a locking portion which is directly engaged with the differential screw, there is a possibility that displacement in the stroke could occur at the time of locking. Therefore, instead of the direct installment of the locking portion with the differential screw, the flow control valve 110 had to include the cover 121 to cover the outer sleeve 116 to prevent changes in the position of the threads as shown in FIG. 16.

(2) The flow regulating mechanism 300 shown in FIG. 25 is provided with the adjustment screw 303 which is rotatable in a predetermined direction so that the needle member 304 is moved to a valve fully open position. In this case, an upper end surface of the direct acting member 302 is brought into contact with an upper inner wall of the valve main body 301, and accordingly the valve fully open position of the needle member 304 is restricted. For example, when the flow regulating mechanism 300 is used for regulating the flow rate of chemical liquid with high corrosion resistance, the valve main body 301 and the direct acting member 302 are likely to be made of fluorocarbon resin in a view of high corrosion resistance. Fluorocarbon resin is softer and has less elasticity than metal. Moreover, motion of the direct acting member 302 is made to be minute by the differential screw. Therefore, the adjustment screw 303 is rotated by a predetermined angle in a predetermined direction after the direct acting member 302 is held against the valve main body 301. This is because resistance generated on the adjustment screw 303 cannot become large enough, and hence an operator could not feel or perceive the moment that the adjustment screw 303 is stopped at the valve fully open position.

Specifically, for example, suppose that when the direct acting member 302 is held against the upper inner wall of the valve main body 301 and then a pressing force of 0.1 mm is applied to the direct acting member 302, a rotation torque exceeds a predetermined value, making an operator to perceive that the valve is fully opened.

When the first thread portion 309 has a pitch of 0.75 mm and the second thread portion 311 has a pitch of 0.5 mm, a pitch difference between the first and second thread portions 309 and 311 is 0.25 mm. In this case, in order to gain the pressing force of 0.1 mm, the adjustment screw 303 needs to be rotated 0.4 turn (the pressing force 0.1 mm/the pitch difference 0.25 mm) after the direct acting member 302 is held against the valve main body 301.

Further, when the first thread portion 309 has a pitch of 0.75 mm and the second thread portion 311 has a pitch of 0.65 mm, the pitch difference between the first and second thread portions 309 and 311 is 0.1 mm. In this case, in order to gain the pressing force of 0.1 mm, the adjustment screw 303 needs to be rotated one turn (the pressing force 0.1 mm/the pitch difference 0.1 mm) after the direct acting member 302 is held against the valve main body 301.

Consequently, in the flow regulating mechanism 300, as the pitch difference between the first and second thread portions 309 and 311 is smaller, a degree of a torque resistance generated when the direct acting member 302 is held against the valve main body 301 could be smaller, so that it could be hard to perceive that the valve is fully opened to keep the valve fully open position.

Thus, in the flow regulating mechanism 300, in order to achieve minute control of a flow rate, the pitch difference between the first and second thread portions 309 and 311 is made smaller. As a result, it becomes hard to perceive a moment when the direct acting member 302 is moved to fully open the valve. Therefore, the flow regulating mechanism 300 could have such a problem that even though the direct acting member 302 is moved to the valve fully open position and held against the valve main body 301, the adjustment screw 303 remains rotated in the predetermined direction, resulting in breaking the first and second thread portions 309 and 311 and other components. Such a problem could happen especially when the valve main body 301 and the direct acting member 302 are made of resin which is softer than metal.

The present invention has been made in view of the above circumstances and has a primary object to overcome the above problems and to provide a flow control valve capable of easily locking a position of a differential screw without displacing an adjusted position of a valve element.

Further, the present invention has a secondary object to provide a flow control valve capable of easily identifying a valve fully open position.

To achieve the above primary purpose, there is provided a flow control valve comprising the following components.

(1) A flow control valve adapted such that an operation member coupled to a valve element body movable into or out of contact with a valve seat provided between a first port and a second port is movably inserted in a cover, and a position of the operation member is adjusted with a differential screw to adjust a position of the valve element body, wherein a rotation member to apply a rotation force to the differential screw is slidably mounted in the cover along a moving direction of the operation member, the rotation member is provided with a locking portion to prevent the rotating member from rotating when the rotation member is slid along the moving direction of the operation member.

(2) In the present invention according to (1), wherein the operation member comprises a stroke adjustment rod inserted in the cover and a movable member which is coupled to the valve element body and which is allowed to move inside the cover but prevented from rotating, the cover is formed with an open end in which the stroke adjustment rod is inserted and is provided with a cylindrical holding member around the open end in which the rotation member is fitted, the differential screw includes a first thread portion which engages the stroke adjustment rod with the cover and a second thread portion which engages the stroke adjustment rod with the movable member, and a projected area of the rotation member is smaller than a projected area of the cover.

(3) In the present invention according to (1) or (2), wherein the locking member is formed with ridges and recesses engaged with a meshing portion with ridges and recesses formed in the cover.

(4) In the present invention according to any one of (1) to (3), wherein the rotation member includes leg portions arranged in a circumferential direction, the cover includes a guide groove with which the leg portions are engaged to be movable therein when the locking portion of the rotation member is disengaged from the cover, and a positioning groove with which the leg portions are engaged when the locking portion of the rotation member is engaged with the cover, and the guide groove and the positioning groove are recessed perpendicularly to the moving direction of the operation member.

To achieve the above secondary purpose, there is provided a flow control valve configuring the following components.

(5) A flow control valve comprising a valve element body movable into or out of contact with a valve seat, a movable member provided integrally with the valve element body, a cover in which the movable member is slidably mounted, a stroke adjustment rod slidably inserted in the cover and connected to the movable member, and a differential screw including a first thread portion provided at a sliding portion between the stroke adjustment rod and the cover and a second thread portion provided at a connecting portion between the movable member and the stroke adjustment rod, wherein the stroke adjustment rod is provided with a first external thread configuring the first thread portion, a second external thread configuring the second thread portion, and a flange protruding outwardly than the second external thread at one end of the first external thread closer to the second external thread.

(6) In the present invention according to (5), wherein the flange is a stopper detachably mounted on an outer peripheral surface of the stroke adjustment rod.

(7) In the present invention according to (6), wherein the cover is formed with a recess around an open end in which the stroke adjustment rod is inserted, the recess being designed to receive the stopper member with a clearance.

In the flow control valve of the present invention comprising the above configuration, when a flow rate is adjusted, the rotation member is slid in a predetermined direction to disengage the locking member from the cover, allowing rotation of the rotation member. Then, the operation member is rotated through the rotation member, a position of the operation member is adjusted by the differential screw, and accordingly a position of the valve seat is adjusted. After the flow rate adjustment is completed, the rotation member is slid in a direction opposite to the predetermined direction without rotating, and the locking member is engaged with the cover, restricting the rotation of the rotation member. Since the differential screw is locked in a manner that the rotation member is slid along a moving direction of the operation member to engage the locking member with the cover without rotating, the position of the differential screw is not displaced from a position during the flow rate adjustment. Therefore, the position adjusted operation member is unlikely to be moved to change a position of the valve element body.

Consequently, in the flow control valve of the present invention, the position of the differential screw can be easily locked without displacing the position of the position adjusted valve element body.

Further, in the flow control valve of the present invention, the first and second thread portions configuring the differential screw are provided coaxially, and a projected area of the rotation member is designed to be smaller than a projected area of the cover. Therefore, there is no necessity to detach the rotation member when the flow control valve is mounted in a panel.

In addition, the locking member is formed with ridges and recesses to be engaged with a meshing portion with ridges and recesses formed in the cover, so a locking structure of the differential screw can be simplified and minimized.

Furthermore, during the flow rate adjustment, the rotation member is rotated in a state that the leg portions of the rotation member are engaged with the guide groove recessed in the cover perpendicularly in section to the moving direction of the operation member. When the rotation member is locked, the rotation member is held by the cover in a state that the leg portions are engaged with the positioning groove recessed in the cover perpendicularly in section to the moving direction of the operation member. Consequently, the rotation member does not slant during both the flow rate adjustment and the locking, so that the operation member and the cover can be kept coaxially, resulting in the smooth flow rate adjustment.

Moreover, when the stroke adjustment rod is rotated and the valve element body is moved to the valve fully open position through screw motion of the first and second thread portions, the flange of the stroke adjustment rod is brought into a surface contact with the cover, and accordingly resistance force by a pitch of the first thread portion irrespective of a pitch difference of the differential screw is applied to the stroke adjustment rod, hence it is easy to identify the valve fully open position because of changes in a rotation torque of the stroke adjustment rod.

Further, since the stopper is mounted on an outer peripheral surface of the stroke adjustment rod in a detachable manner, it is easy to replace only the stopper with a new one even when the stopper gets damaged due to repeated operation or the like.

Furthermore, even if the stroke adjustment rod is moved to the valve fully open position and the stopper is pressed to be deformed, an outer peripheral surface of the stopper is held by a side wall of the recess, so that the stopper is prevented from being disengaged.

DETAILED DESCRIPTION OF EMBODIMENTS

A detailed description of preferred embodiments of a flow control valve embodying the present invention will now be given referring to the accompanying drawings.

First Embodiment

Figure 1:
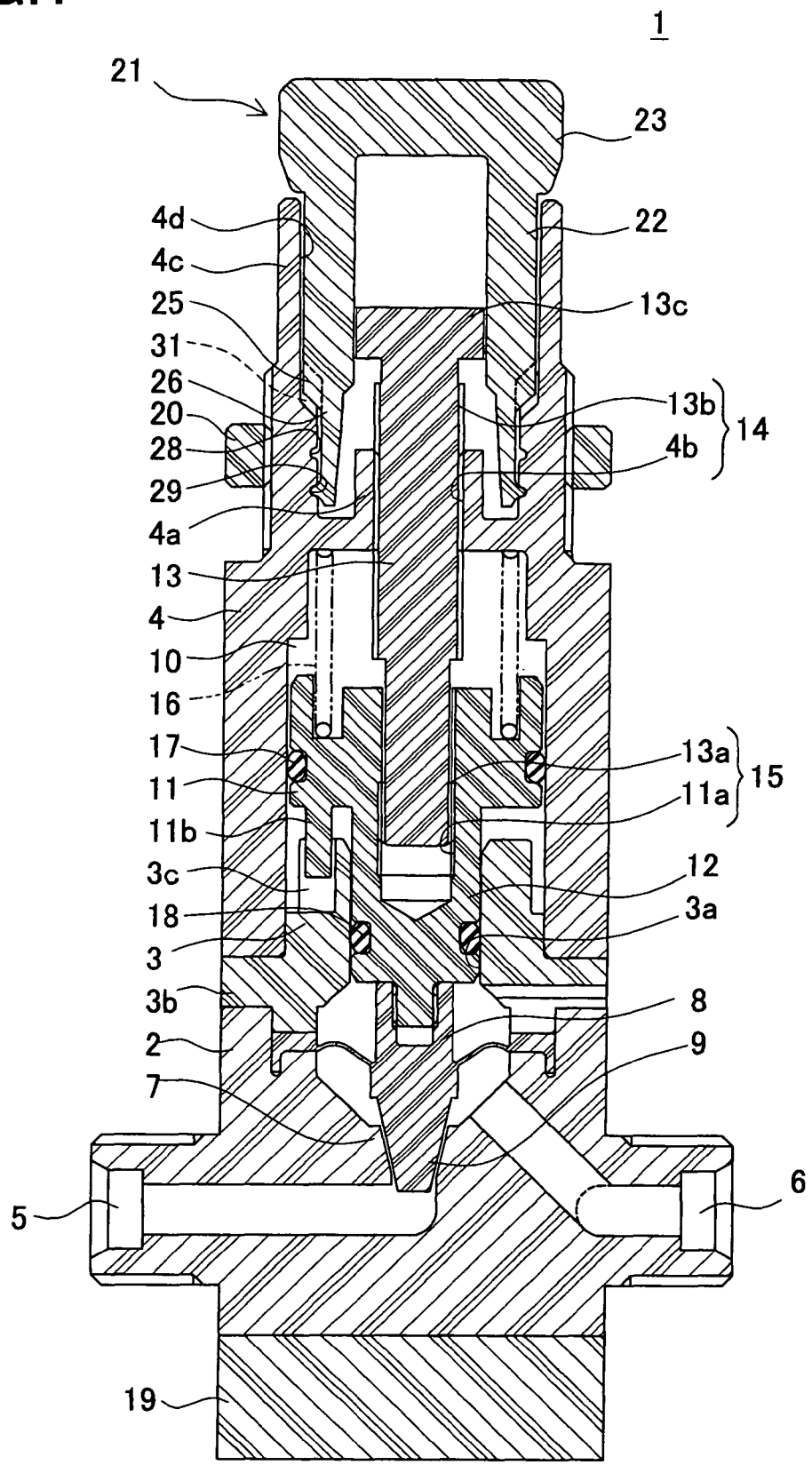
FIG. 1 is a sectional view of a flow control valve in a locked state in a first embodiment of the present invention.
Figure 2:
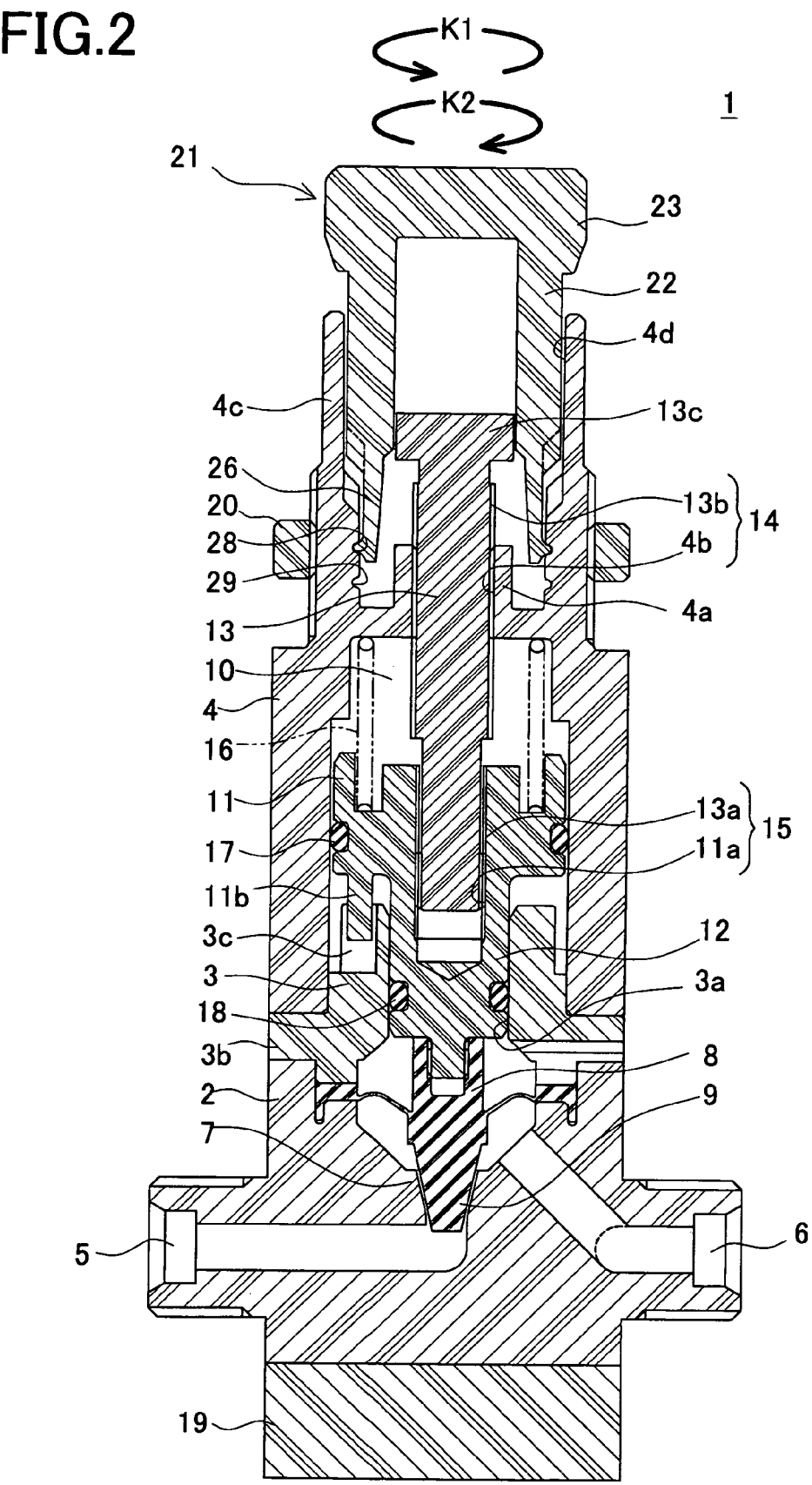
FIG. 2 is a sectional view of the flow control valve in an unlocked state in the first embodiment.

FIG. 1 is a sectional view of a flow control valve 1 in a locked state. FIG. 2 is a sectional view of the flow control valve 1 in an unlocked state.

The flow control valve 1 of the present invention, similar to the prior arts, is mounted in a semiconductor manufacturing device for discharging and controlling fluids such as high corrosive chemical liquids or ultra pure water. Main components of the flow control valve 1 are made of resin to be usable in a corrosive atmosphere.

The flow control valve 1 is exteriorly configured with a passage block 2, a holding member 3, a cover 4, and a mounting board 19 which are placed one on another and secured together by four bolts (not shown) inserted from above and connected to insert molded nuts (not shown) in the mounting board 19. These metallic bolts (not shown) and nuts (not shown) are covered with fluorocarbon resin coating from a view of corrosion resistance. Further, in order to keep the bolts (not shown) from being exposed to an outer atmosphere, countersunk portions of the bolts (not shown) are capped (not shown) to protect the bolts from the corrosive atmosphere.

As shown in FIGS. 1 and 2, the passage block 2 is made of block-shaped resin such as PTFE (polytetrafluoroethylene) or PFA (tetrafluoroethylene perfluoroalkylvinyl ether copolymer) which is excellent in thermal resistance and corrosion resistance. The passage block 2 is formed with a first port 5 and a second port 6 that are communicated with each other through a valve seat 7 formed therebetween. The holding member 3 is made of cylindrical block-shaped resin such as PP (polypropylene) which is high resistant to corrosion and easy to be shaped. The holding member 3 is formed with a flange 3b extending radially outwardly from an outer peripheral surface thereof. The cover 4 is made of cup-shaped resin such as PP which is high resistant to corrosion and easy to be shaped. The cover 4 is placed to cover the holding member 3 so that the flange 3b of the holding member 3 is held between a lower end surface of the cover 4 and an upper end surface of the passage block 2.

A resin diaphragm valve element 8 is firmly held between the passage block 2 and the holding member 3. The diaphragm valve element 8 is made of circular-shaped resin such as PTFE which is excellent in thermal resistance and corrosion resistance. The diaphragm valve element 8 includes a center portion forming a valve element body 9 of a conical shape. The flow control valve 1 is formed with a valve seat 7 which has an inner peripheral surface tapered corresponding to a tapered outer peripheral surface of the valve element body 9. A lower end of the valve element body 9 is insertable in the valve seat 7 to define a sectional area between the outer peripheral surface of the valve element body 9 and the inner peripheral surface of the valve seat 7 for minute flow rate adjustment.

A chamber 10 is defined by the holding member 3 and the cover 4 and houses a movable member 11. The movable member 11 is made of cylindrical-shaped resin such as PVDF (polyvinylidene difluoride) or PCTFE (polychlorotrifluoroethylene) which is relatively excellent in hardness, thermal resistance, and corrosion resistance. The movable member 11 is formed with a cylindrical-shaped protrusion 12 at a lower end thereof. The protrusion 12 is movably inserted into a through hole 3a formed through the holding member 3 and is threadedly engaged with the diaphragm valve element 8. The movable member 11 is further formed with a bottomed hole formed along an axial direction from an upper end of the movable member 11, and a resin-made second internal thread 11a is integrally formed with the movable member 11 on an inner peripheral surface of the bottomed hole. A guide portion 11b is provided in the movable member 11 protruding downward in the figure and is slidably engaged with a guide groove 3c formed in the holding member 3 to prevent rotation of the movable member 11.

The cover 4 is formed with a boss portion 4a. A stroke adjustment rod 13 is inserted through the boss portion 4a to be movable upward and downward. A lower end of the rod 13 is connected to the movable member 11 provided inside the chamber 10. The rod 13 is made of bar-shaped resin such as PVDF or PCTFE which is relatively excellent in hardness, thermal resistance, and corrosion resistance. On an outer periphery of a lower end portion, the rod 13 is formed integrally with a resin-made second external thread 13a. The second external thread 13a of the rod 13 and the second internal thread 11a of the movable member 11 are threadedly engaged to configure a second thread portion 15.

The stroke adjustment rod 13 is formed integrally with a resin-made first external thread 13b above the second external thread 13a configuring the second thread portion 15. The cover 4 is formed integrally with a resin-made first internal thread 4b at an inner peripheral surface of the boss portion 4a in which the rod 13 is inserted. The first external thread 13b of the rod 13 and the first internal thread 4b of the cover 4 are threadedly engaged to configure a first thread portion 14.

These first and second thread portions 14 and 15 are formed with threads of the same hand but of different pitches so that the pitch of the first thread portion 14 is greater than that of the second thread portion 15. A pitch difference between the first and second thread portions 14 and 15 minutely adjusts a position of the movable member 11 and accordingly a position of the diaphragm valve element 8. In other words, the flow control valve 1 includes a differential screw composed of the resin-made first and second thread portions 14 and 15. Consequently, the differential screw does not include any metal.

A spring (an urging member) 16 is mounted in a contracted state in between the movable member 11 and the cover 4. The spring 16 urges the valve element body 9 of the diaphragm valve element 8 toward the valve seat 7 (downward in the figure) through the movable member 11 and the stroke adjustment rod 13. At the same time, the rod 13 is pressed down toward the valve seat 7 (downward in the figure) to make respective contact face of the first and second thread portions 14 and 15 on the same side contact with the rod 13 so as to prevent backlash. The metal-made spring 16 is covered with fluorocarbon resin coating to ensure corrosion resistance.

In the flow control valve 1, an O ring 17 made of rubber material such as fluorocarbon rubber or perfluoroelastomer is fitted in an annular groove formed on an upper end peripheral surface of the movable member 11. The O ring 17 is radially inwardly pressed to be elastically deformed between the movable member 11 and the cover 4. Further, in the movable member 11, an O ring 18 made of rubber material such as fluorocarbon rubber or perfluoroelastomer is fitted in an annular groove formed on an outer peripheral surface of the protrusion 12. The O ring 18 is radially inwardly pressed to be elastically deformed between the protrusion 12 of the movable member 11 and an inner wall of the through hole 3a of the holding member 3. The elastically deformed O rings 17 and 18 exert restoring force to press the movable member 11 in the axial radial direction, aligning an axis of the movable member 11 with the cover 4.

The cover 4 of the flow control valve 1 is provided with a cylindrical holding portion 4c radially concentrically formed around the boss portion 4a and fitted in a knob 21. The holding portion 4c includes an inner radial portion 4d in which a main body 22 of the knob 21 is inserted, and a shoulder is provided axially inward (lower) than the inner radial portion 4d. On the shoulder, a knurled groove (meshing portion) 31 is formed to receive a locking portion 25 of the knob 21 from above along the axial direction. Furthermore, the holding portion 4c is formed, on a lower side than the shoulder, with a first annular groove (a guide groove) 28 and a second annular groove (a positioning groove) 29 in parallel and in different positions in a direction perpendicular in section to a moving direction of the stroke adjustment rod 13. Leg portions 26 of the knob 21 are slidably fittable in each of the first and second annular grooves 28 and 29.

Figure 3:
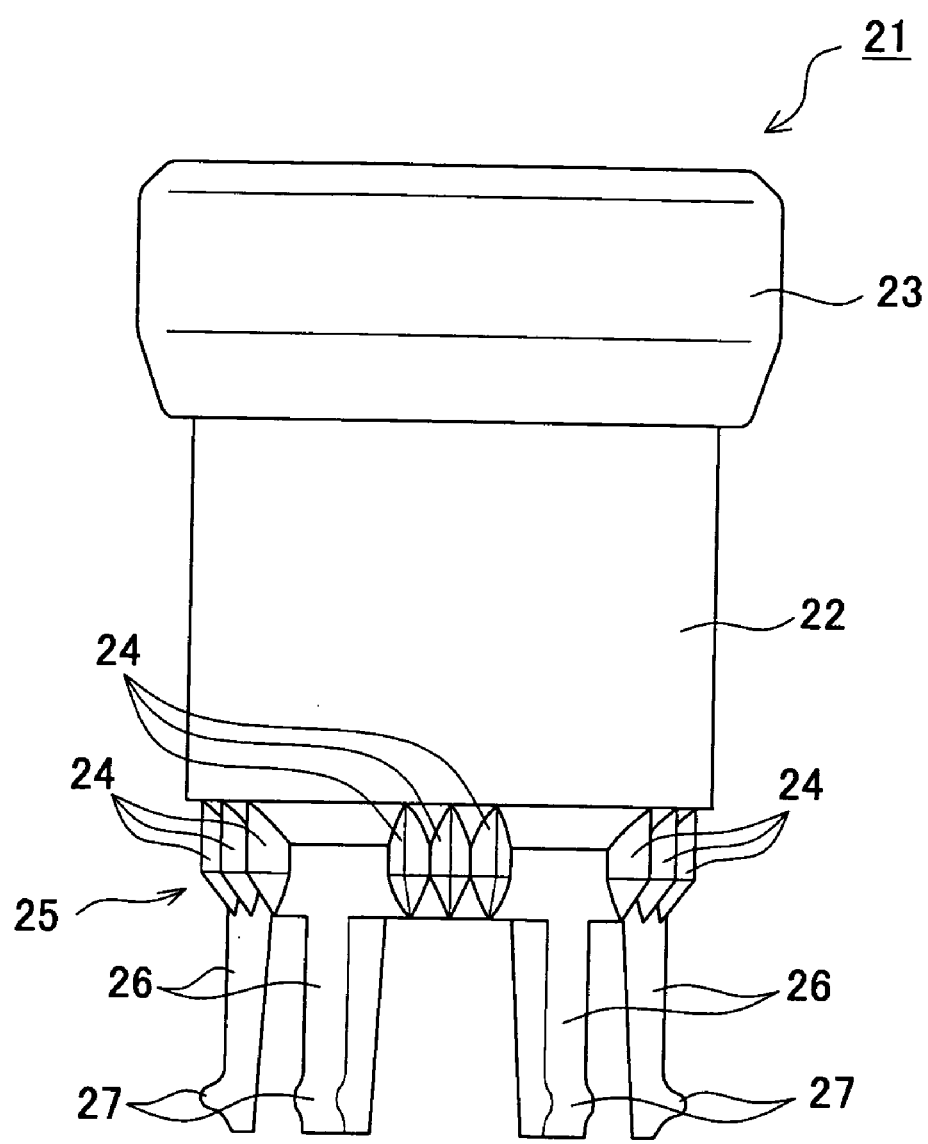
FIG. 3 is a side view of a knob used in the flow control valve in the first embodiment.
Figure 4:
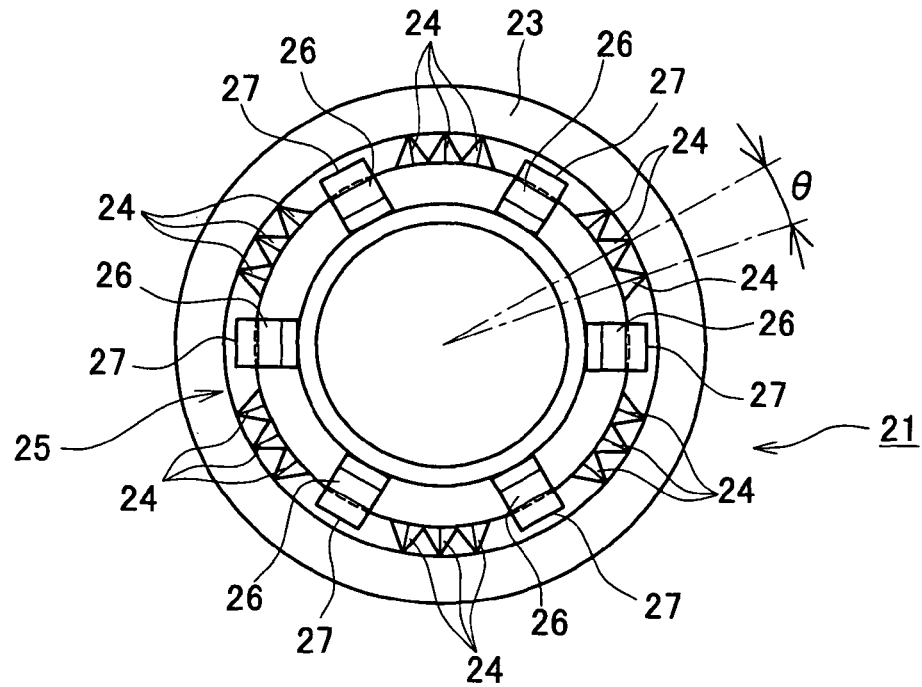
FIG. 4 is a bottom view of the knob viewed from a side of leg portions.
Figure 5:
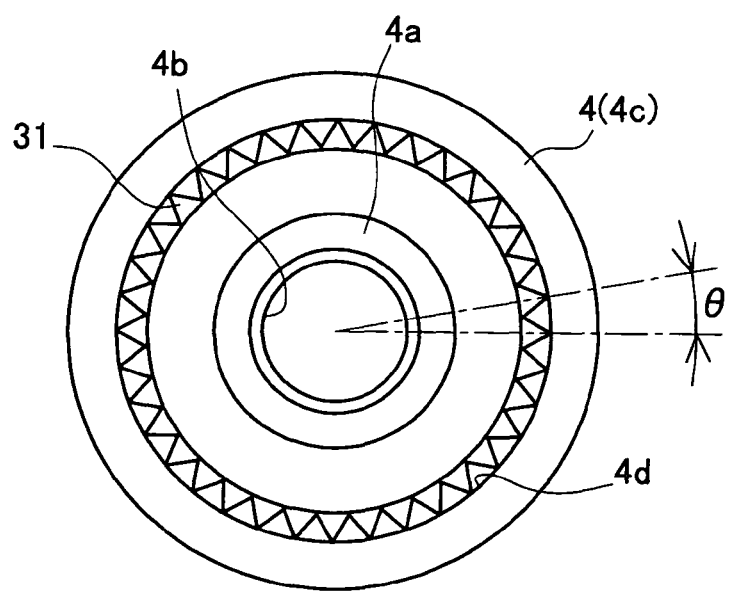
FIG. 5 is an upper view of a cover viewed from a side of a boss portion.

FIG. 3 is a side view of the knob 21 used in the flow control valve 1 shown in FIG. 1. FIG. 4 is a bottom view of the knob 21 viewed from a side of the leg portions 26. FIG. 5 is a top view of the cover 4 viewed from a side of the boss portion 4a.

As shown in FIG. 3, the knob 21 is made of resin such as PP and is of a cup-shape with one open end. The knob 21 comprises a head portion 23, a main body 22, the locking portion 25, and the leg portions 26. In the main body 22, an outer diameter is designed to be equal to or slightly smaller than an inner diameter of the inner radial portion 4d of the cover 4 so that the knob 21 is rotatable and slidable inside the inner radial portion 4d. An upper end of the main body 22 in FIG. 3 forms the head portion 23. The head portion 23 is designed to have an outer diameter greater than the inner diameter of the inner radial portion 4d of the cover 4, thereby preventing the knob 21 from excessively going into the holding portion 4c. Further, the outer diameter of the head portion 23 is designed to be smaller than the outer diameter of the holding portion 4c so that a projected area of the knob 21 is smaller than a projected area of the holding portion 4c of the cover 4. A lower side of the main body 22 is provided integrally with the resin-made locking portion 25 engaged with the cover 4 to restrict rotation of the knob 21 and resin-made engagement bulbous portions 27 to hold a position of the knob 21 in place with respect to the cover 4.

As shown in FIGS. 3 and 4, the main body 22 includes a lower end with reduced thickness formed as a shoulder portion. At the shoulder portion, the locking portion 25 is formed in an uneven shape so as not to protrude out from the outer peripheral surface of the main body 22. The locking portion 25 is constituted of triangular projections 24, 24, 24 which are arranged in groups of three on a periphery of the main body 22 at equally spaced intervals. As shown in FIG. 5, each projection 24 is pitched at an angle θ equal to an angle of a ridge of the knurled groove 31 so that each projection 24 can be meshed with the knurled groove 31 at the inner peripheral surface of the holding portion 4c of the cover 4. In the first embodiment, the angle θ is set to 10 degrees. As shown in FIG. 5, each ridge of the knurled groove 31 is of triangular protruding shape. Therefore, the projections 24 of the locking portion 25 in the knob 21 can be easily meshed with the knurled groove 31 of the cover 4.

As shown in FIGS. 3 and 4, the knob 21 is provided with the comb-like leg portions 26 at the lower side of the main body 22. The leg portions 26 are circumferentially arranged at equally spaced intervals but not at positions corresponding to the projections 24 of the locking portion 25 so that excessive external force is not applied to a proximal end. The leg portions 26 are formed with each distal end that extends outwardly than the proximal end and is elastically deformable. At the distal ends of the leg portions 26, the engagement bulbous portions 27 are formed outwardly to be slidably fitted in each of the first and second annular grooves 28 and 29 (refer to FIGS. 1 and 2) of the cover 4.

Figure 6:
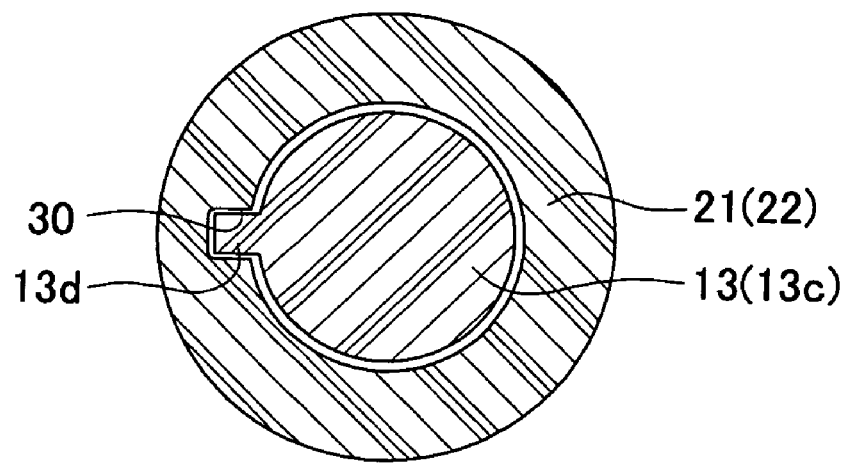
FIG. 6 is a view showing an engagement portion between the knob and a stroke adjustment rod.

FIG. 6 is a view showing a positional relationship between the stroke adjustment rod 13 and the knob 21.

At an upper end portion 13c of the rod 13, a projected portion 13d is formed protruding radially outwardly. The knob 21 is provided with a long key groove 30 axially extending in the inner peripheral surface of the knob 21 to engage with the projected portion 13d. The projected portion 13d of the rod 13 is fitted in the key groove 30 to transmit a rotation force of the knob 21 to the rod 13 through the projected portion 13d, and accordingly the rod 13 is rotated integrally with the knob 21. Additionally, the key groove 30 is designed to be engaged with the projected portion 13d of the rod 13 anytime both the knob 21 is locked and unlocked.

When the thus configured flow control valve 1 is mounted in a panel for constructing a semiconductor manufacturing device or the like, a projected area of the knob 21 is smaller than a projected area of the cover 4, so that the knob 21 will not obstruct attachment and detachment of the flow control valve 1 by means of a mounting nut 20. Consequently, the flow control valve 1 can be mounted in a panel for constructing a semiconductor manufacturing device or the like without detaching the knob 21.

Then, a method of adjusting a flow rate by using the above configured flow control valve 1 will be explained.

In the flow control valve 1, as shown in FIG. 1, the knob 21 is pressed down in the holding portion 4c of the cover 4 with the engagement bulbous portions 27 of the leg portions 26 in the knob 21 being engaged with the second annular groove 29 of the cover 4. In that state, the projections 24 of the locking portion 25 of the knob 21 are meshed with the knurled groove 31 to hold the knob 21 against rotation. As a result, in the flow control valve 1, the stroke adjustment rod 13 can not be rotated through the knob 21 to adjust the position of the diaphragm valve element 8.

Then, when the knob 21 is pulled upward from the holding portion 4c of the cover 4, the leg portions 26 are inwardly elastically deformed to separate the engagement bulbous portions 27 from the second annular groove 29, and accordingly the knob 21 is slid upward. When the engagement bulbous portions 27 of the knob 21 are moved up to a position of the first annular groove 28, the leg portions 26 are outwardly restored to fit the engagement bulbous portions 27 in the first annular groove 28 as shown in FIG. 2. In this state, the projections 24 of the locking portion 25 of the knob 21 are disengaged from the knurled groove 31 to allow the rotation, resulting in the unlocked state.

Subsequently, when the knob 21 is rotated in a direction K1 indicated in FIG. 2 to lift up the stroke adjustment rod 13, the movable member 11 is lifted up in accordance with the pitch difference between the second thread portion 15 and the first thread portion 14 to separate the valve element body 9 of the diaphragm valve element 8 from the valve seat 7, thereby increasing the flow rate.

On the other hand, when the knob 21 is rotated in a direction K2 in the figure to move the rod 13 down, the movable member 11 is moved down in accordance with the pitch difference between the second thread portion 15 and the first thread portion 14 to bring the valve element body 9 of the diaphragm valve element 8 closer to the valve seat 7, reducing the flow rate.

During the flow rate adjustment, the knob 21 is rotated while sliding the engagement bulbous portions 27 in and along the first annular groove 28, so that the knob 21 is rotated smoothly without getting stuck or jammed inside the holding portion 4c of the cover 4.

Further, since the first and second thread portions 14 and 15 are made of resin with less friction, sliding parts of the first and second thread portions 14 and 15 do not need a lubricant such as grease. Therefore, oil contamination can be prevented.

After the flow rate adjustment is completed, the knob 21 is pressed down into the holding portion 4c of the cover 4. The leg portions 26 of the knob 21 are inwardly elastically deformed to disengage the engagement bulbous portions 27 from the first annular groove 28, sliding the knob 21 downward in the figure. When the engagement bulbous portions 27 of the knob 21 go down to a position of the second annular groove 29, the leg portions 26 are outwardly restored to fit the engagement bulbous portions 27 in the second annular groove 29 as shown in FIG. 1. In this state, the projections 24 of the locking portion 25 in the knob 21 are meshed with the knurled groove 31 to restrict the rotation, resulting in the locked state.

However, when the projections 24 of the locking portion 25 and ridges of the knurled groove 31 are not meshed appropriately, there is a possibility that the knob 21 could be rotated in order to mesh the projections 24 of the locking portion 25 with the ridges of the knurled groove 31. However, even in this case, the knob 21 is rotated only by one or two ridge(s) of the knurled groove 31, so the stroke adjustment rod 13 can not be lifted. Therefore, the adjusted stroke hardly changes.

Specifically, for example, it is assumed that the differential motion between the first and second thread portions 14 and 15 rotate the stroke adjustment rod 13 one turn to move the diaphragm valve element 8 by 0.05 mm. Then, it is assumed that when the knob 21 is slid to mesh the locking portion 25 to the knurled groove 31, thus meshed relation between the locking portion 25 and the knurled groove 31 is displaced by two ridges of the knurled groove 31. In the first embodiment, each ridge of the knurled groove 31 and each protrusion 24 of the locking portion 25 are arranged at the pitch angle of 10 degrees in a circumferential direction. Therefore, after the flow rate adjustment, even if the knob 21 is rotated additionally by 20 degrees corresponding to two ridges of the knurled groove 31 and then the locking portion 25 is meshed with the knurled groove 31, the stroke adjustment rod 13 moves along the axial direction only by 0.003 mm (0.05 mm×(20 degrees/360 degrees)), causing no stroke changes.

Figure 17:
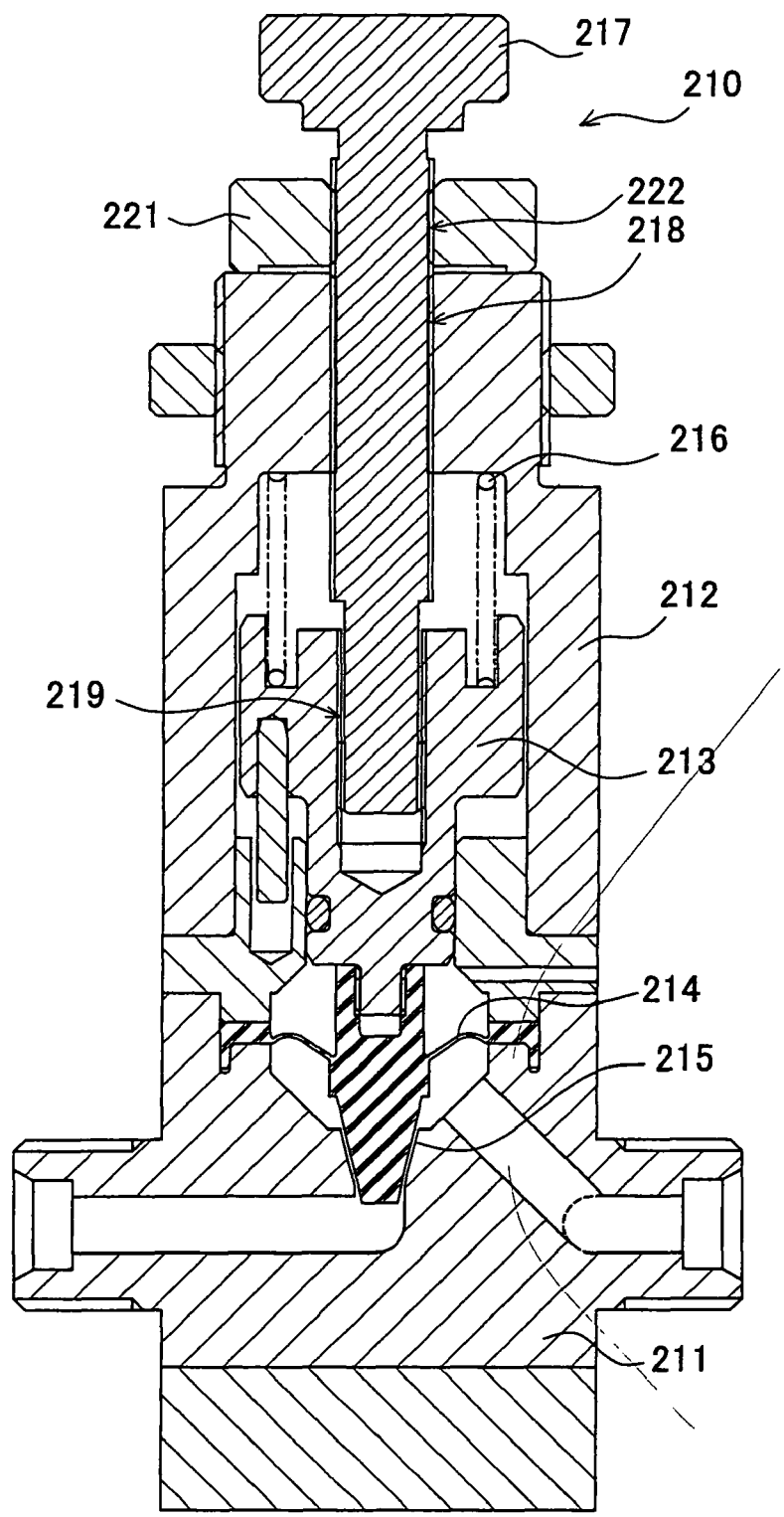
FIG. 17 is a sectional view of a flow control valve in which thread positions are fixed by means of a locknut.
Figure 18:
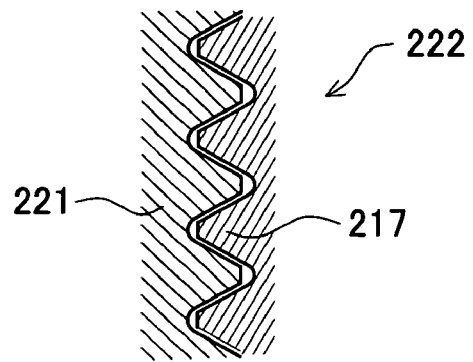
FIG. 18 is a view showing a positional relationship between threads of the locknut and the stroke adjustment rod during flow controlling in the flow control valve in FIG. 17.
Figure 19:
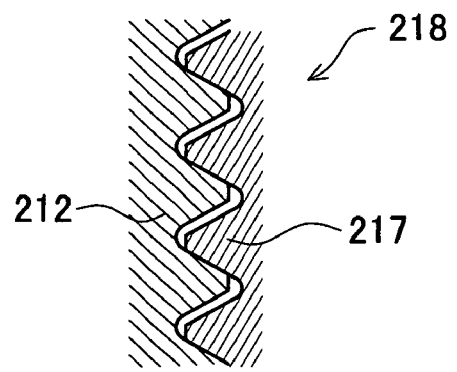
FIG. 19 is a view showing a positional relationship between threads of a cover and the stroke adjustment rod during the flow control of the flow control valve.
Figure 20:
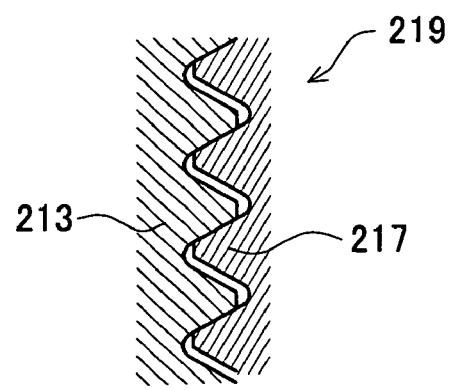
FIG. 20 is a view showing a positional relationship between threads of a movable member and the stroke adjustment rod during the flow control of the flow control valve.
Figure 21:
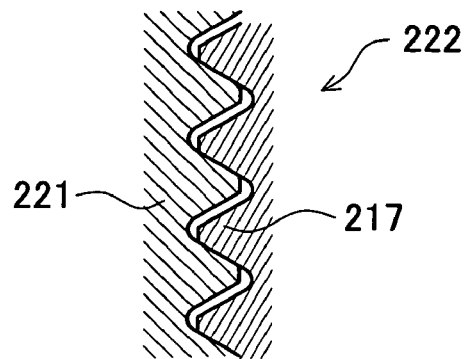
FIG. 21 is a view showing a positional relationship between the threads of the locknut and the stroke adjustment rod in a locked state of the flow control valve.
Figure 22:
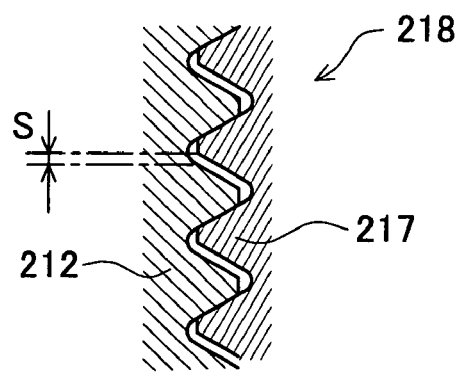
FIG. 22 is a view showing a positional relationship between the threads of the cover and the stroke adjustment rod in the locked state.
Figure 23:
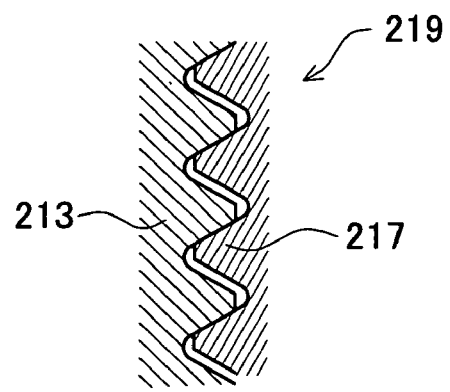
FIG. 23 is a view showing a positional relationship between the threads of the movable member and the stroke adjustment rod in the locked state.
Figure 24:
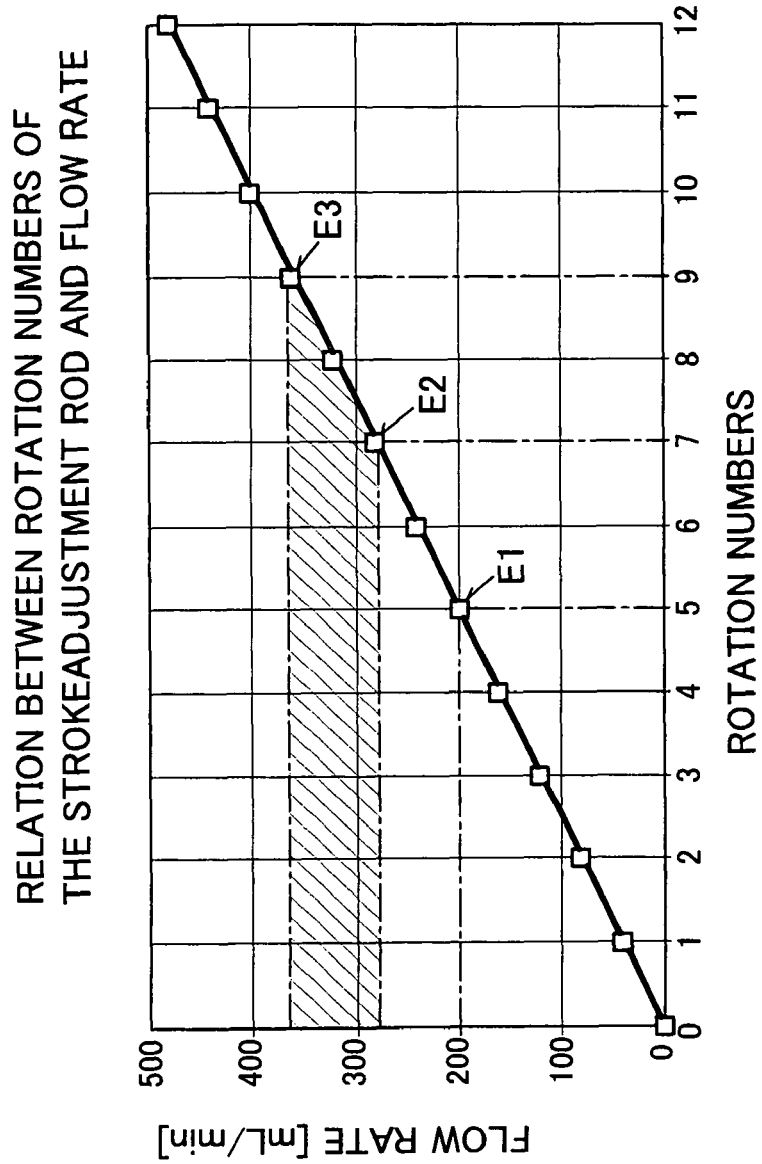
FIG. 24 is a graph showing a relation between rotation numbers of the stroke adjustment rod and flow rate of the flow control valve in FIG. 17 wherein a longitudinal axis indicates flow rate (mL/min) and a lateral axis indicates the rotation numbers.
Figure 25:
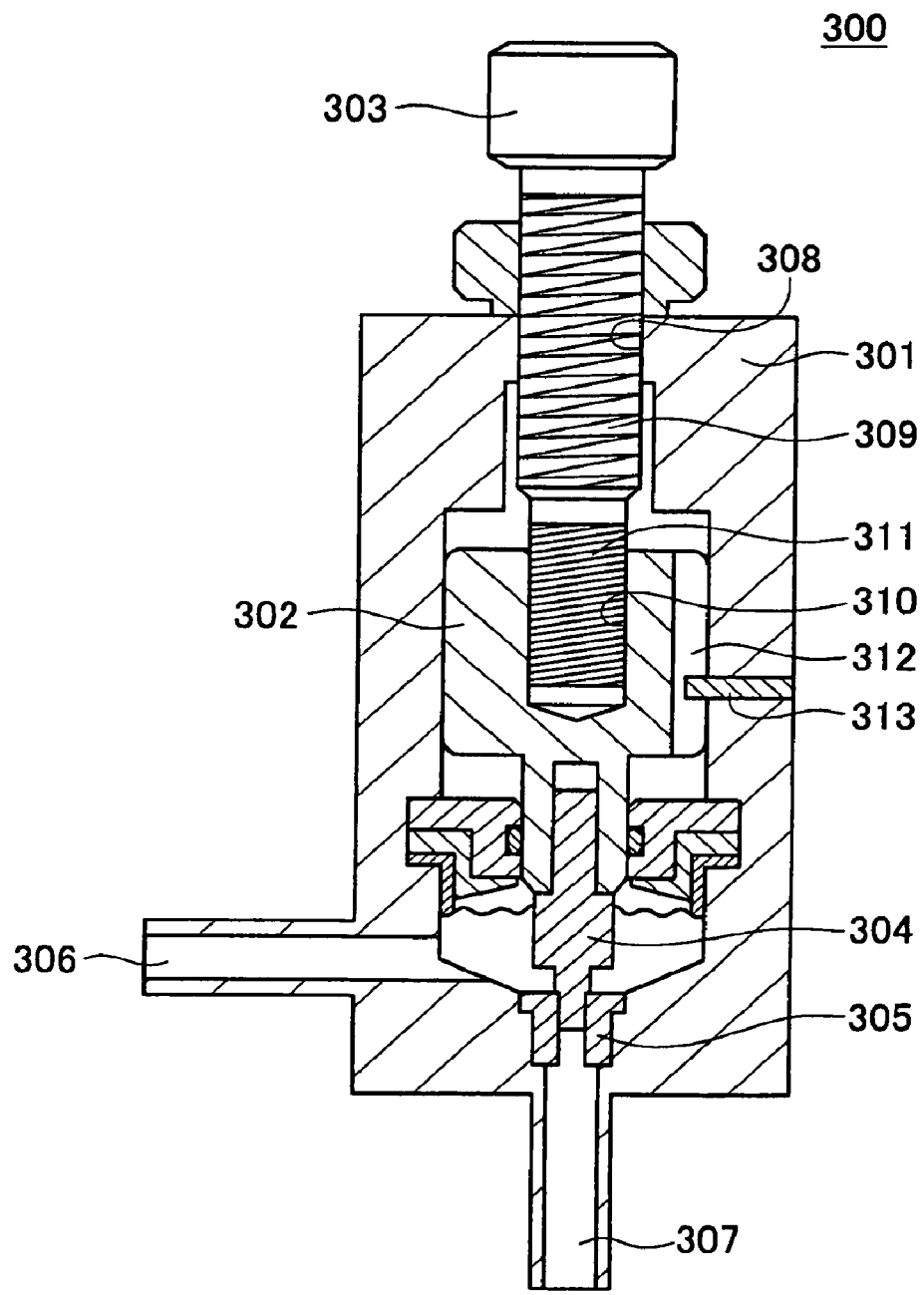
FIG. 25 is a sectional view of a flow regulating mechanism of Patent Document 2.

Furthermore, while the flow control valve 210 shown in FIG. 17 is provided with the first thread portion 218 made of resin, if the locknut 221 is tightened too firmly, there is a possibility that the stroke could change not only by the backlash of the first thread portion 218 but also by the elastic deformation thereof. However, in the flow control valve 1 of the first embodiment shown in FIG. 1, the knob 21 is not rotated excessively in the locked state, so that the first and second thread portions 14 and 15 are unlikely to be elastically deformed to change the stroke.

In addition, after the flow rate adjustment, the stroke adjustment rod 13 is covered with the knob 21 so that the rod 13 can not be directly touched. Therefore, there is no possibility that an operator accidentally touches the rod 13 to change the stroke.

Consequently, in the flow control valve 1 of the first embodiment, when the flow rate is to be adjusted as shown in FIG. 2, the knob 21 is slid upward in the figure to place the projections 24 of the locking portion 25 out of engagement with the knurled groove 31 of the cover 4, and thereby the knob 21 is allowed to be rotated. Then, the stroke adjustment rod 13 is rotated through the knob 21 to adjust the position of the differential screw, so that the position of the diaphragm valve element 8 is adjusted. After the flow rate adjustment is completed, the knob 21 is slid downward in the figure without being rotated in order to engage the protrusions 24 of the locking portion 25 with the knurled groove 31 of the cover 4, and thereby restricting the rotation of the knob 21. As for the differential screw, since the knob 21 is moved without rotating along the axial direction of the stroke adjustment rod 13 to engage the projections 24 of the locking portion 25 with the knurled groove 31 of the cover 4, the screw position in the locked state is not displaced from the screw position at the time of flow rate adjustment. Therefore, there is no possibility that the adjusted rod 13 is moved to change the position of the diaphragm valve element 8 during the locking.

Consequently, in the flow control valve 1 of the first embodiment, the position of the differential screw can be easily locked without displacing the position of the diaphragm valve element 8.

In addition, in the flow control valve 1 of the first embodiment, the first and second thread portions 14 and 15 configuring the differential screw are provided in parallel along the axial direction, and the projected area of the knob 21 is smaller than the projected area of the cover 4. Therefore, it is not necessary to detach the knob 21 when the flow control valve 1 is mounted in a panel.

Further, in the flow control valve 1 of the first embodiment, the locking portion 25 is of an uneven shape conforming to the uneven knurled groove 31 formed in the cover 4. Therefore, the locking structure of the differential screw can be simplified and minimized. Especially, since the projections 24 of the locking portion 25 and the ridges of the knurled groove 31 are of triangular shape, they can be meshed smoothly by sliding their contact surfaces along each other.

Moreover, in the flow control valve 1 of the first embodiment, during the flow rate adjustment, the knob 21 is rotated as the engagement bulbous portions 27 of the leg portions 26 of the knob 21 are engaged in the first annular groove 28 recessed in the cover 4 perpendicularly in section to the movement direction of the stroke adjustment rod 13. On the other hand, during the locking, the knob 21 is held by the cover 4 as the engagement bulbous portions 27 of the leg portions 26 are engaged in the second annular groove 29 formed in the cover 4 perpendicular in section to the movement direction of the rod 13. Consequently, the knob 21 will not incline during both the flow rate adjustment and the locking, thus maintaining coaxiality between the rod 13 and the cover 4, so that the flow rate can be adjusted smoothly.

Second Embodiment

Figure 7:
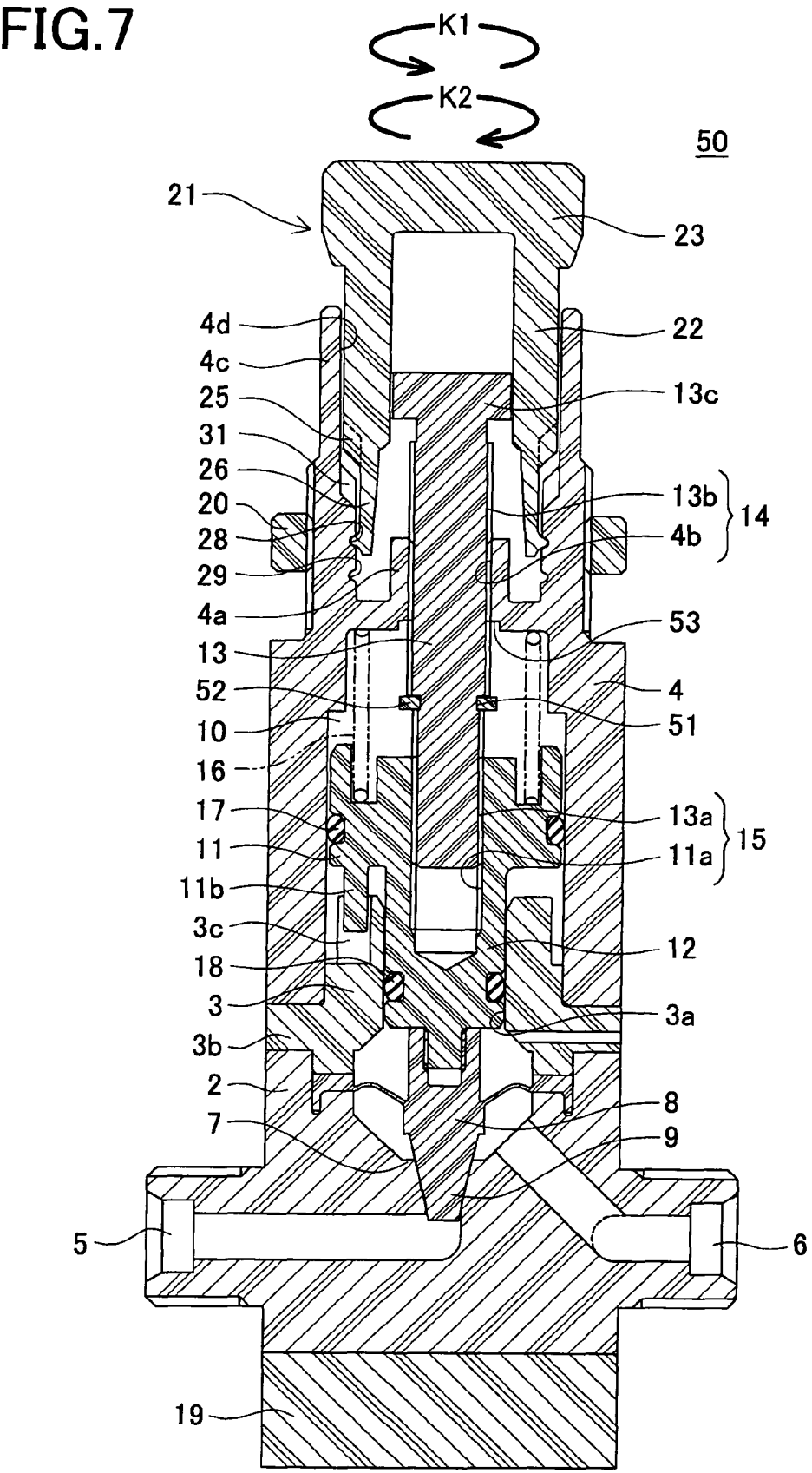
FIG. 7 is a sectional view of a flow control valve in an unlocked and fully closed state in a second embodiment.
Figure 8:
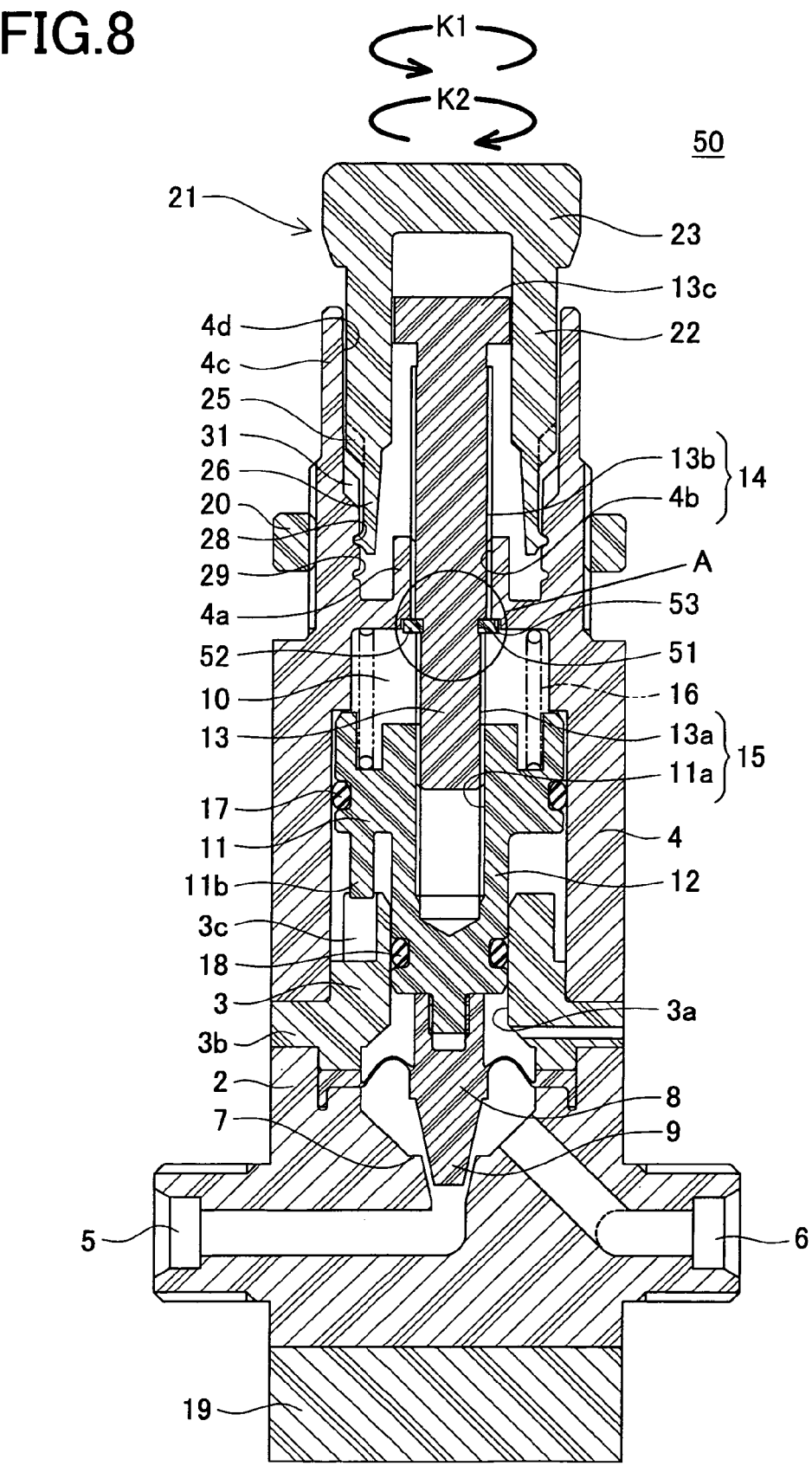
FIG. 8 is a sectional view of the flow control valve in an unlocked and fully opened state in the second embodiment.

A detailed description of the second embodiment of a flow control valve embodying the present invention will now be given referring to the accompanying drawings. FIG. 7 is a sectional view of a flow control valve 50 of the second embodiment in a locked and valve fully closed state. FIG. 8 is a sectional view of the flow control valve 50 in an unlocked and valve fully opened state.

The flow control valve 50 of the second embodiment is different from the flow control valve 1 of the first embodiment as for a configuration that a C ring 52 as one example of "a protruding part" and "a stopper" is mounted on the stroke adjustment rod 13 to function as a stopper, and other features are same as the first embodiment. Therefore, same configurations as those of the flow control valve in the first embodiment are designated by the same reference codes and their descriptions are omitted, and the following explanation is focused on features different from the first embodiment.

The flow control valve 50 is provided with a mounting groove 51 on an outer peripheral surface of the stroke adjustment rod 13 to hold the C ring 52 in a detachable manner. The mounting groove 51 is formed on one end of the first external thread 13b closer to the second external thread 13a (lower side in the figure) corresponding to a valve fully open position of the rod 13. The mounting groove 51 has a width equal to or slightly greater than a width of the C ring 52 in order to restrict axial movement of the C ring 52. This C ring 52 mounted in the mounting groove 51 protrudes radially outwardly from an outer peripheral surface of the rod 13. In other words, the C ring 52 protrudes outwardly than the first external thread 13b. The cover 4 is provided with a recess 53 which is shaped by cutting or the like around a lower open end of the first internal thread 4b. As shown in FIG. 8, the recess 53 is designed to have a slight clearance from an outer peripheral surface of the C ring 52 to receive the C ring 52 with a slight clearance to prevent an inner wall of the recess 53 from coming into contact with the C ring 52 and hence to prevent unnecessary resistance when the rod 13 moves along an axial direction.

Figure 9:
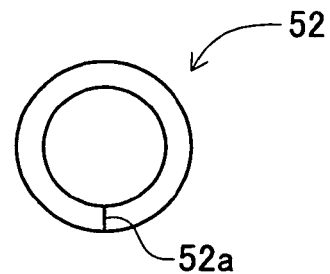
FIG. 9 is a plan view of a C ring used in the flow control valve in the second embodiment.
Figure 10:
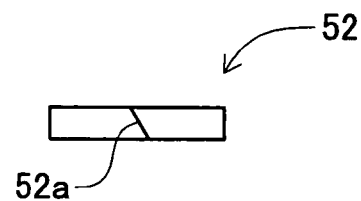
FIG. 10 is a side view of the C ring in FIG. 9.

FIG. 9 is a plan view of the C ring 52, and FIG. 10 is a side view of the C ring 52.

The C ring 52 is made of resin material such as PP or PVDF shaped into an annular form and provided with a slit 52a. The C ring 52 has enough elasticity to open the slit 52a and to be mounted in the mounting groove 51 of the stroke adjustment rod 13. The slit 52a is shaped obliquely with both split ends facing and coming into contact with each other so as to prevent the C ring 52 from being disengaged from the rod 13.

Figure 11:
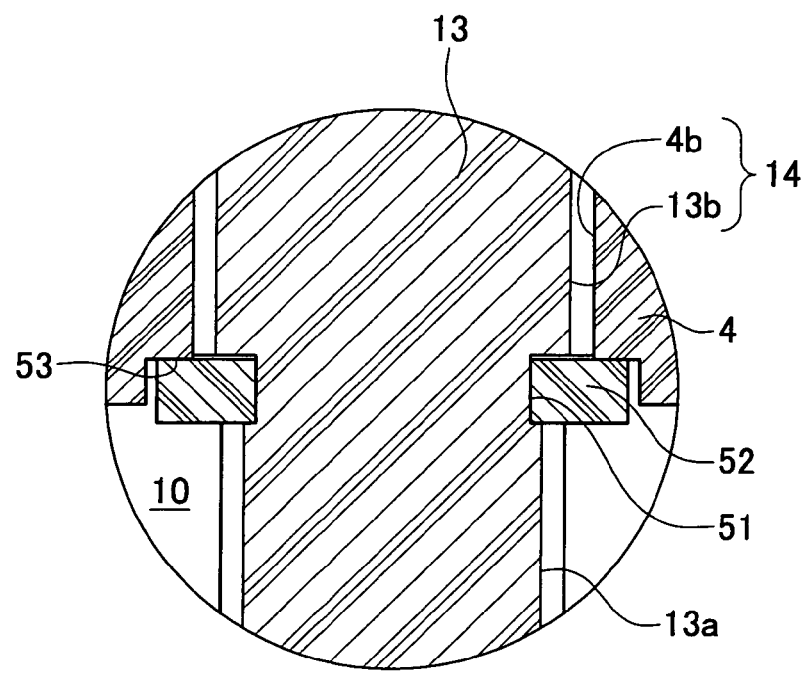
FIG. 11 is an enlarged view of a part A in FIG. 8.

FIG. 11 is an enlarged view of a part A in FIG. 8.

The slit 52a of the C ring 52 is opened to fit the C ring 52 in the mounting groove 51 of the stroke adjustment rod 13, and then the C ring 52 is restored to close the slit 52a, so that the C ring 52 is fastened to the rod 13. Axial movement of the C ring 52 is restricted by top and bottom groove walls of the mounting groove 51. In this state, an inner peripheral surface closer to the rod 13 of the C ring 52 is tightly stuck to the rod 13, preventing the C ring 52 from being disengaged from the rod 13.

Then, action of the flow control valve 50 is explained.

As shown in FIG. 7, when an operator unlocks and rotates the knob 21 in a direction K1 in the figure, the stroke adjustment rod 13 is lifted up by screw motion of the first thread portion 14, and accordingly the diaphragm valve element 8 is lifted up by a pitch difference between the first and second thread portions 14 and 15. When the rod 13 is lifted up until a lower end of the first external thread 13b is engaged with the first internal thread 4b as shown in FIG. 8, the C ring 52 is loosely fitted in the recess 53 and moreover, the C ring 52 is pressed toward a bottom wall of the recess 53 having a surface contact therebetween as shown in FIG. 11. Consequently, upward movement of the rod 13 by means of the screw motion is restricted, causing remarkable increase in rotation torque of the knob 21. Therefore, an operator is able to confirm the valve fully open position by changes in resistance torque generated by rotation of the knob 21.

In addition, as shown in FIG. 11, when the C ring 52 is pressed against the bottom wall of the recess 53, the C ring 52 is elastically deformed while opening the slit 52a. However, since the outer peripheral surface of the C ring 52 is held by a side wall of the recess 53, the elastic deformation is restricted. Therefore, even if the slit 52a is opened to generate a force to hold the C ring 52, the C ring 52 is not disengaged from the stroke adjustment rod 13.

On the other hand, as shown in FIG. 8, when an operator unlocks and rotates the knob 21 in a direction K2 in the figure, the stroke adjustment rod 13 is moved downward by the screw motion of the first thread portion 14, and accordingly the diaphragm valve element 8 is moved downward by the pitch difference between the first and second thread portions 14 and 15. At this time, the C ring 52 is restored to the original shape by its own elastic force after being separated from the cover 4.

Figure 12:
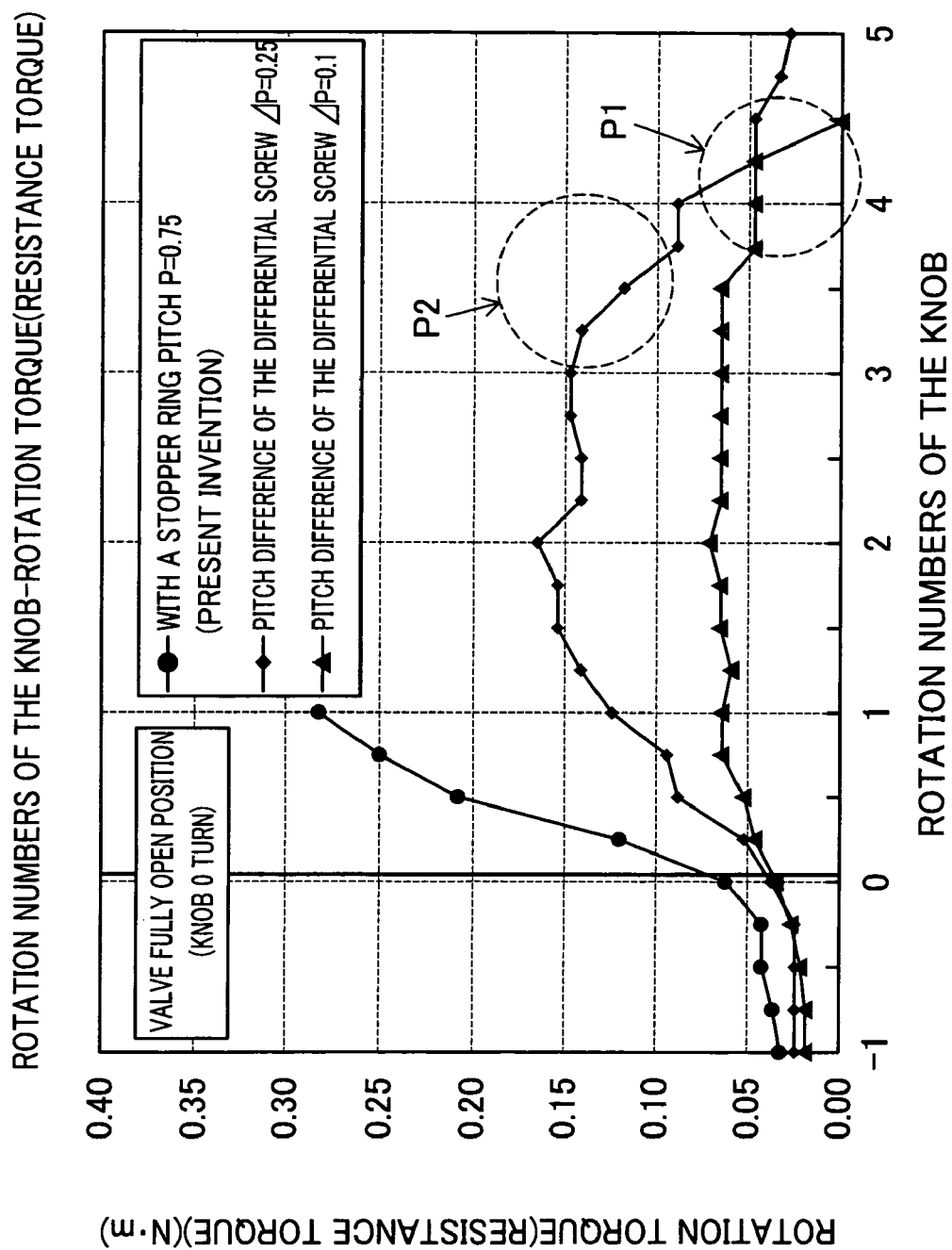
FIG. 12 is a graph showing a relation between rotation numbers of the knob and rotation torque (resistance torque) wherein a longitudinal axis indicates the rotation torque (resistance torque) (N.m) and a lateral axis indicates the rotation numbers of the knob.

By the way, the inventors of the present invention have studied a relation between rotation numbers of the knob 21 and the rotation torque (resistance torque). Result of this experiment is shown in FIG. 12. Reference value "0" of the rotation numbers of the knob 21 is set to a position where the diaphragm valve element 8 is in the valve fully open position.

When the knob 21 is rotated in the direction K1 (opening direction) in FIGS. 7 and 8 from a reference position "0", the rotation number is indicated with plus. When the knob 21 is rotated in the direction $K_2$ (closing direction) in FIGS. 7 and 8 from the reference position, the rotation number is indicated with minus.

In the experiment, first, the C ring 52 is detached from the flow control valve 50 in FIG. 7, and then changes in the resistance torque by the pitch difference of the differential screw are examined.

As indicated with ▲ in FIG. 12, when the pitch difference of the differential screw is 0.1 mm, rotation torque of about 0.4 N.m is generated in the knob 21 at the reference position. When the knob 21 is rotated three fourth turn in the direction K1 from the reference position, in calculation, the movable member 11 is pressed against the cover 4 with a pressing force of 0.075 mm, so that the rotation torque goes up to 0.07 N.m. Subsequently, the rotation torque is relatively stable until the knob 21 is rotated 4 turns in the direction K1 from the reference position. As indicated with P1 in FIG. 12, when the knob 21 is rotated fifteen fourth turn in the direction K1 from the reference position, the rotation torque starts to drop considerably, resulting in breaking of the first and second thread portions 14 and 15.

Then, as indicated with ♦ in FIG. 12, when the pitch difference of the differential screw is 0.25 mm, rotation torque of about 0.04 N.m is generated by the knob 21 at the reference position. When the knob 21 is rotated one second turn in the direction K1 from the reference position, the movable member 11 is pressed against the cover 4 with a pressing force of 0.125 mm, so that the rotation torque goes up to about 0.09 N.m. Subsequently, as the knob 21 is kept rotated, the rotation torque gradually goes up. Then, when the knob 21 is rotated 2 turns from the reference position, the movable member 11 is pressed against the cover 4 with the pressing force of 0.5 mm, generating the largest value of the rotation torque, about 0.17 N.m. Then, if the knob 21 is further kept rotated in the direction K1, the rotation torque goes down to about 0.15 N.m and then is stabilized. After that, as indicated with P2 in FIG. 12, when the knob 21 is rotated fourteen fourth turn in the direction K1 from the reference position, the rotation torque starts to drop considerably, resulting in breaking of the first and second thread portions 14 and 15.

According to the above results of the experiment, it is concluded that if the pitch difference of the differential screw is smaller, when the knob 21 is rotated in the direction K1 from the reference position to generate the rotation torque, changes in the rotation torque also become smaller. Further, when the pitch difference of the differential screw is smaller, it is concluded that the difference of the rotation torque between a point when the knob 21 is rotated in the direction K1 beyond the reference position and a point when the first and second thread portions 14 and 15 are broken become smaller. Consequently, if the pitch difference of the differential screw is smaller, an operator cannot confirm that the diaphragm valve element 8 reaches the valve fully open position, so that the knob 21 could be rotated until the first and second thread portions 14 and 15 and others are broken.

Based on the result of the above experiment, the C ring 52 is then fitted in the stroke adjustment rod 13 to examine a relation between the rotation torque and the rotation numbers of the knob 21 as follows.

As indicated with ● in FIG. 12, rotation torque of the knob 21 is 0.07 N.m at the reference position. When the knob 21 is rotated one fourth turn in the direction $K_1$, the C ring 52 fitted in the stroke adjustment rod 13 is pressed against the cover 4 with a pressing force of 0.1875 mm, so that the rotation torque sharply goes up to 0.12 N.m which is as twice as the value at the reference position. Subsequently, if the knob 21 is further rotated in the direction K1, the rotation torque keeps going up to rotate the knob 21 one turn. By the time when the C ring 52 fitted in the rod 13 is pressed against the cover 4 with the pressing force of 0.75 mm, the rotation torque goes up to 0.28 N.m which is as four times as the value at the reference position.

Consequently, in the flow control valve 50 of the second embodiment, when the stroke adjustment rod 13 is rotated in the direction K1 to lift the diaphragm valve element 8 to the valve fully open position, the C ring 52 as a stopper mounted in a part that does not have any contact with the differential screw, comes into a surface contact with the cover 4, and accordingly a certain value of resistance torque is generated not only by the pitch difference of the differential screw but also by a pitch of the first thread portion 14 provided between the rod 13 and the cover 4. By such resistance torque, an operator can certainly feel the moment that the diaphragm valve element 8 is stopped and can easily identify the valve fully open position.

More specifically, in the flow control valve 50, the C ring 52 is fitted in the mounting groove 51 formed in the stroke adjustment rod 13. When the knob 21 is rotated in the direction K1 to move the diaphragm valve element 8 to the valve fully open position, the C ring 52 is brought into contact with the cover 4 to prevent the diaphragm valve element 8 from rising by the screw motion of the first thread portion 14 formed between the rod 13 and the cover 4. Accordingly, the rotation torque (resistance torque) is remarkably increased (refer to FIGS. 8, 11, and 12), so that it is easy to feel the moment that the knob 21 is stopped at the valve fully open position. Therefore, the first and second thread portions 14 and 15 are unlikely to be broken due to excessive rotation of the knob 21.

Further, in the flow control valve 50 of the second embodiment, since the C ring 52 is detachably mounted on the outer peripheral surface of the stroke adjustment rod 13 (refer to FIGS. 7 and 8), even when the C ring 52 gets damaged due to repeated operation or the like, it is easy to replace only the C ring with a new one. In addition, because the C ring 52 is made of resin, even in a case that the flow control valve 50 is used in a corrosive atmosphere, the C ring 52 neither gets corroded nor disengages from the rod 13.

Furthermore, in the flow control valve 50 of the second embodiment, when the stroke adjustment rod 13 is moved to the valve fully open position to press the C ring 52 against the cover 4, the slit 52a of the C ring 52 is opened. When the C ring 52 is deformed until the outer peripheral surface of the C ring 52 is held by the side wall of the recess 53, the slit 52a is prevented from being opened further, restricting further deformation of the C ring 52. Therefore, in the flow control valve 50, when the C ring 52 is pressed against the bottom wall of the recess 53 to be deformed and accordingly an operator can feel the moment that the rod 13 is stopped, the C ring 52 is held by the side wall of the recess 53 and prevented from being deformed. Therefore, the C ring 52 is not disengaged from the rod 13.

Third Embodiment

Figure 13:
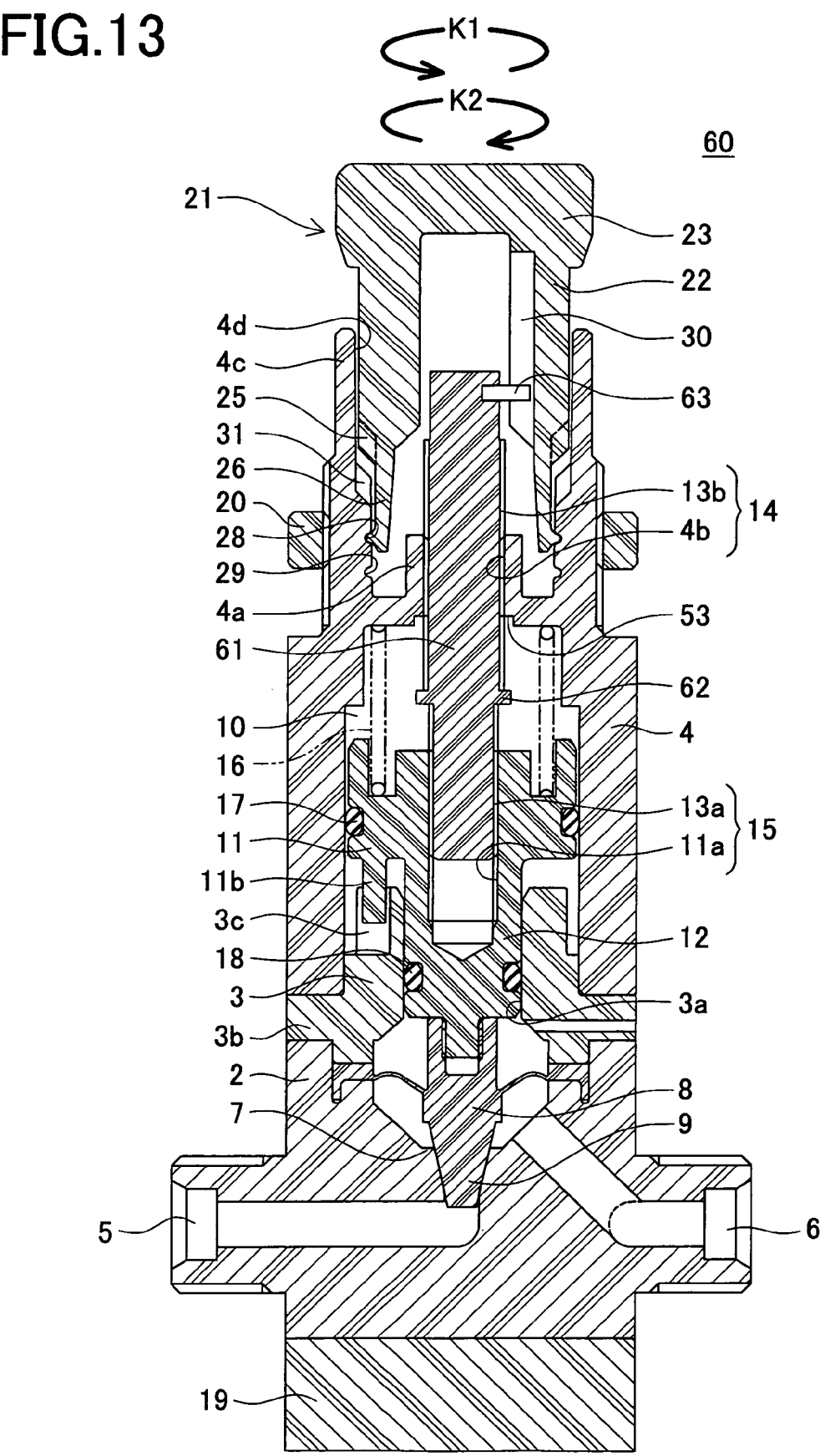
FIG. 13 is a sectional view of a flow control valve in an unlocked and fully closed state in a third embodiment.

Then, a detailed description of the third embodiment of a flow control valve embodying the present invention will now be given referring to the accompanying drawings. FIG. 13 is a sectional view of a flow control valve 60 of the third embodiment in the present invention in an unlocked and fully closed state.

The flow control valve 60 of the third embodiment is different from the flow control valve of the second embodiment as for a configuration that a flange 62 is integrally provided in a stroke adjustment rod 61 instead of the C ring 52, and other features are same as the second embodiment. Therefore, same configurations as those of the flow control valve in the second embodiment are designated by the same reference codes and their descriptions are omitted, and the following explanation is focused on features different from the second embodiment.

The flow control valve 60 is provided with the stroke adjustment rod 61 made of resin material such as PVDF or PCTFE with relatively higher hardness, thermal resistance, and chemical resistance and inserted through the cover 4. The rod 61 is provided integrally with the flange 62 by means of molding or cutting or the like at one end of the first external thread 13b closer to the second external thread 13a. The flange 62 is formed circumferentially on an outer peripheral surface of the rod 61. External end of the flange 62 protrudes outwardly from the outer peripheral surface of the rod 61. In other words, the flange 62 protrudes outwardly than the first external thread 13b. The flange 62 is designed large enough to be loosely fitted in the recess 53 provided in the cover 4. A top end portion of the rod 61 is designed to have a diameter equal to or smaller than a diameter of the first external thread 13b so that the first external thread 13b is engaged with the first internal thread 4b of the cover 4 and inserted through the boss portion 4a. The rod 61 is formed with a pin hole on an outer peripheral surface of an upper end portion, and a guide pin 63 is pressurized and fitted in the pin hole. The guide pin 63 is engaged with the key groove 30 of the knob 21 to prevent rotation of the rod 61.

In the flow control valve 60 comprising the above configuration, the stroke adjustment rod 61 is inserted into the boss portion 4a from a lower open end of the cover 4, and the guide pin 63 is pressurized and fitted in the rod 61 which protrudes from an upper open end of the boss portion 4a in the figure. In this state, the flange 62 of the rod 61 is locked by the recess 53 of the cover 4, so that the rod 61 cannot go through the boss portion 4a from the lower open end to the upper open end when the rod 61 is mounted. After the rod 61 is mounted in the cover 4, the spring 16 is mounted in the cover 4, the second external thread 13a of the rod 61 is engaged with the first internal thread 11a of the movable member 11, and accordingly the cover 4 is combined with the passage block 2. Then, the mounting nut 20 is mounted in the cover 4. Finally, the guide pin 63 of the rod 61 is slidably fitted in the key groove 30, so that the knob 21 is mounted in the cover 4.

When the thus assembled flow control valve 60 is unlocked and the knob 21 is rotated in a direction K1 in the figure, the rotation force is transmitted to the stroke adjustment rod 61 through the guide pin 63. The rod 61 is lifted up by screw motion of the first thread portion 14, and the diaphragm valve element 8 is lifted up in accordance with a pitch difference between the first and second thread portions 14 and 15. When the rod 61 is moved to a valve fully open position, the flange 62 is brought into contact with a bottom surface of the recess 53 formed in the cover 4, restricting further upward movement of the rod 61 by means of the screw motion. Thereby, rotation torque of the knob 21 is increased. Therefore, an operator can easily confirm that the diaphragm valve element 8 is moved to the valve fully open position because of increase in resistance torque of the knob 21.

Consequently, in the flow control valve 60 of the third embodiment, when the stroke adjustment rod 61 is rotated in the direction K1 and the diaphragm valve element 8 is moved to the valve fully open position by means of the screw motion of the first and second thread portions 14 and 15, the flange 62 is brought into a surface contact with the cover 4, restricting the upward movement of the rod 61, so that the rotation torque (resistance torque) of the knob 21 is increased. Therefore, the flow control valve 60 is capable of easily identifying the valve fully open position by changes in the rotation torque (resistance torque) of the knob 21 irrespective of a pitch difference of the differential screw.

In the flow control valve 60 of the third embodiment, the flange 62 is integrally provided with the stroke adjustment rod 61 and is made of resin, so the flange 62 cannot be corroded to be broken even when the rod 61 is used in a corrosive atmosphere. Further, even though the rod 61 cannot be replaced independently because the rod 61 is integrally mounted in the flow control valve 60, it is not necessary to take laborious procedures such as providing the mounting groove 51 or mounting the C ring 52 in the rod 61.

The present invention may be embodied in other specific forms without departing from the essential characteristics thereof.

Figure 14:
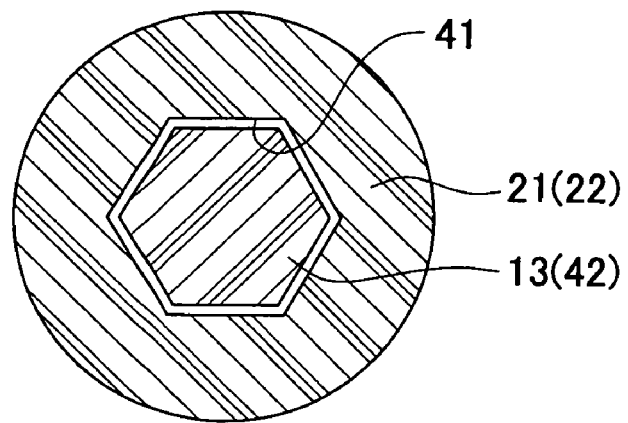
FIG. 14 is a first modified view showing an engagement portion of a knob and a stroke adjustment rod.
Figure 15:
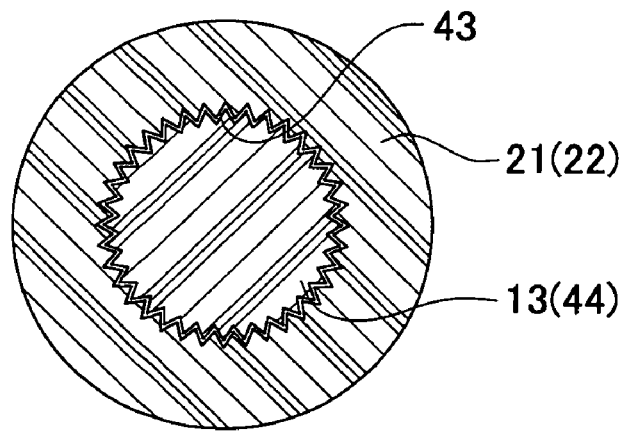
FIG. 15 is a second modified view showing an engagement portion of a knob and a stroke adjustment rod.
Figure 16:
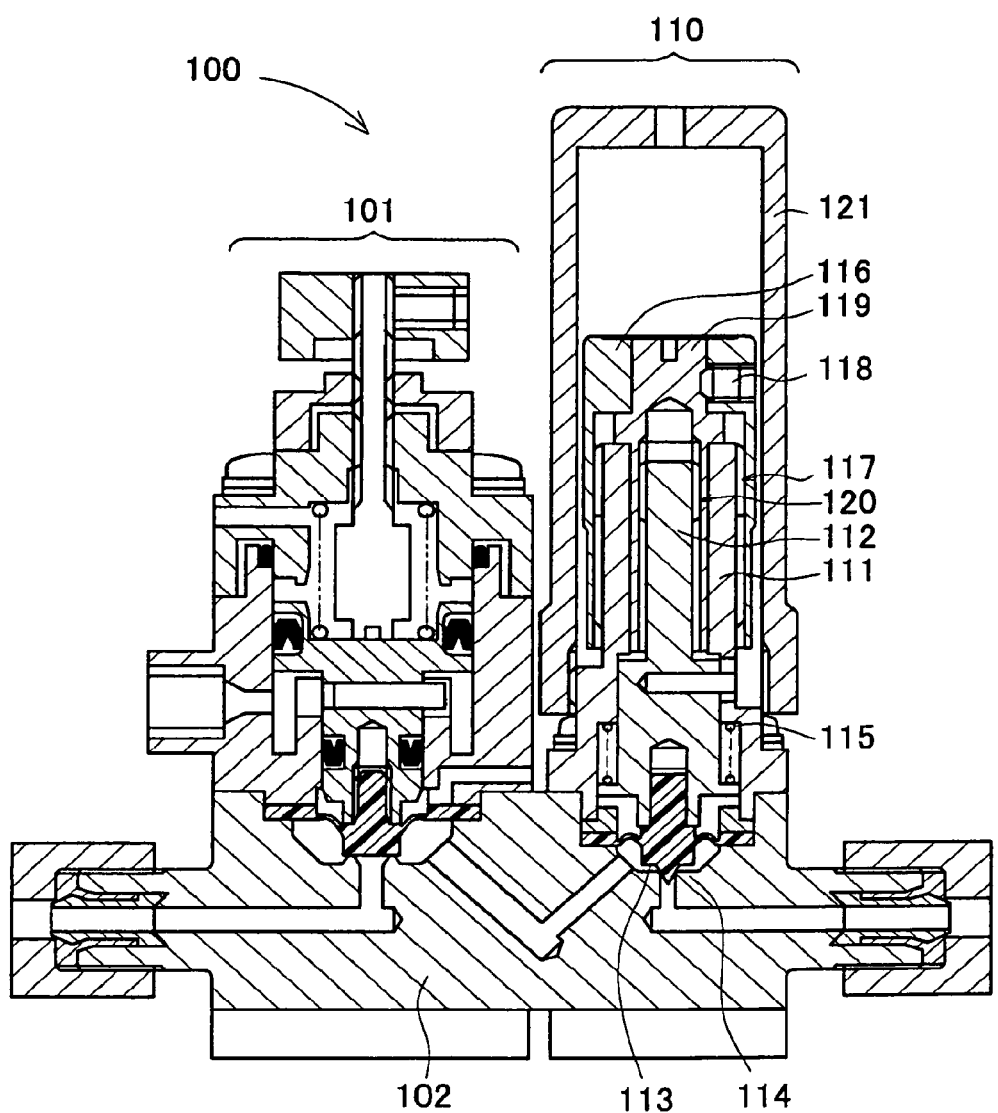
FIG. 16 is a sectional view of a valve unit comprising a flow control valve in Patent Document 1.

(1) For example, in the above mentioned embodiments, the projected portion 13d of the stroke adjustment rod 13 is slidably fitted in the key groove 30 of the knob 21 to transmit the rotation force to the rod 13. On the other hand, as shown in a first modification in FIG. 14, for example, an inner peripheral surface 41 of the knob 21 and an upper end portion 42 of the rod 13 may be formed to polygonal shapes and engaged together. Alternatively, as shown in FIG. 15, both an inner peripheral surface 43 of the knob 21 and an outer peripheral surface of an upper end portion 44 of the rod 13 may be provided with ridges and valleys to engage serrations of the knob 21 and rod 13, so that the rotation force can be transmitted from the knob 21 to the rod 13.

(2) For instance, in the above mentioned embodiments, the locking portion 25 is provided with the projections 24, 24, 24 which are arranged in groups of three at equally spaced intervals, but the projections may be provided on the whole periphery of the main body 22. Further, the projections 24 of the locking portion 25 and the ridges of the knurled groove 31 are of triangular shapes in the above embodiments, but they may be of square, rectangular, or semicircular shapes.

(3) For example, in the above mentioned second embodiment, the C ring 52 is used as one example of "a protrusion portion" and "a stopper", but resin or rubber made O ring may be employed instead. Further, the stroke adjustment rod 13 may be formed with the C ring 52 fixed to the rod 13 by an adhesive or the like instead of being formed with the mounting groove 51. Alternatively, the C ring 52 may be supported and fixed to the rod 13 by a fixing member.

(4) For example, in the above mentioned third embodiment, the flange 62 is circumferentially provided, but "a protrusion portion" may be circumferentially intermittently provided as ridge portions which protrude outwardly than the first external thread 13b. In addition, for instance, in the above mentioned third embodiment, the first external thread 13b of the stroke adjustment rod 61 is thinner than the second external thread 13a, but the external thread 13b may be wider than the second external thread 13a so that a shoulder defined between the first and second external threads 13b and 13a can be used as a protrusion portion.

(5) In the above mentioned embodiments, the spring 16 is provided on an upper side upper than the movable member 11, but the spring 16 may be mounted lower than the movable member 11.

What is claimed is:

1. A flow control valve comprising;
a first port;
a second port;
a valve seat provided between the first port and the second port;
a valve element body movable into or out of contact with the valve seat;
an operation member coupled to the valve element body;
a cover in which the operation member is movably inserted;
a differential screw to adjust a position of the operation member to adjust a position of the valve element body; and
a rotation member mounted in the cover to be slidable along a moving direction of the operation member, the rotation member being adapted to apply a rotation force to the differential screw, wherein:
the rotation member is provided with a locking portion to prevent the rotation member from rotating when the rotation member is slid, along the moving direction of the operation member,
the operation member comprises:
a stroke adjustment rod inserted in the cover; and
a movable member which is coupled to the valve element body and which is allowed to move inside the cover but prevented from rotating,
the cover is formed with an open end in which the stroke adjustment rod is inserted and is provided with a cylindrical holding member around the open end in which the rotation member is fitted,
the differential screw includes a first thread portion which engages the stroke adjustment rod with the cover and a second thread portion which engages the stroke adjustment rod with the movable member, and
a projected area of the rotation member is smaller than a projected area of the cover.

2. A flow control valve comprising:
a first port;
a second port;
a valve seat provided between the first port and the second port;
a valve element body movable into or out of contact with the valve seat;
an operation member coupled to the valve element body;
a cover in which the operation member is movably inserted;
a differential screw to adjust a position of the operation member to adjust a position of the valve element body; and
a rotation member mounted in the cover to be slidable along a moving direction of the operation member, the rotation member being adapted to apply a rotation force to the differential screw, wherein:
the rotation member is provided with a locking portion to prevent the rotation member from rotating when the rotation member is slid along the moving direction of the operation member,
the rotation member includes leg portions arranged in a circumferential direction,
the cover includes a guide groove with which the leg portions are engaged to be movable therein when the locking portion of the rotation member is disengaged from the cover, and a positioning groove with which the leg portions are engaged when the locking portion of the rotation member is engaged with the cover, and
the guide groove and the positioning groove are formed perpendicularly to the moving direction of the operation member.

3. The flow control valve according to claim 1, wherein:
the stroke adjustment rod is provided with a first external thread configuring the first thread portion, a second external thread configuring the second thread portion, and a flange protruding outwardly than the second external thread at one end of the first external thread closer to the second external thread.

4. The flow control valve according to claim 3, wherein the flange is a stopper detachably mounted on an outer peripheral surface of the stroke adjustment rod.

5. The flow control valve according to claim 4, wherein the cover is formed with a recess around an open end in which the stroke adjustment rod is inserted, the recess being designed to receive the stopper member with a clearance.

6. The flow control valve according to claim 1, wherein the locking member is formed with ridges and recesses engaged with a meshing portion with ridges and recesses formed in the cover.

7. The flow control valve according to claim 1 wherein the rotation member includes leg portions arranged in a circumferential direction,
the cover includes a guide groove with which the leg portions are engaged to be movable therein when the locking portion of the rotation member is disengaged from the cover, and a positioning groove with which the leg portions are engaged when the locking portion of the rotation member is engaged with the cover, and
the guide groove and the positioning groove are formed perpendicularly to the moving direction of the operation member.

8. A flow control valve comprising:
a first port;
a second port;
a valve seat provided between the first port and the second port;
a valve element body movable into or out of contact with the valve seat;
an operation member coupled to the valve element body;
a cover in which the operation member is movably inserted;
a differential screw to adjust a position of the operation member to adjust a position of the valve element body; and
a rotation member mounted in the cover to be slidable along a moving direction of the operation member, the rotation member being adapted to apply a rotation force to the differential screw, wherein:
the rotation member is provided with a locking portion to prevent the rotation member from rotating when the rotation member is slid along the moving direction of the operation member,
the locking member is formed with ridges and recesses engaged with a meshing portion with ridges and recesses formed in the cover,
the rotation member includes leg portions arranged in a circumferential direction,
the cover includes a guide groove with which the leg portions are engaged to be movable therein when the locking portion of the rotation member is disengaged from the cover, and a positioning groove with which the leg portions are engaged when the locking portion of the rotation member is engaged with the cover, and
the guide groove and the positioning groove are formed perpendicularly to the moving direction of the operation member.

* * * * *